INVENTORS
ERWIN H. HARTEL &
SIEGFRIED G. HARTEL

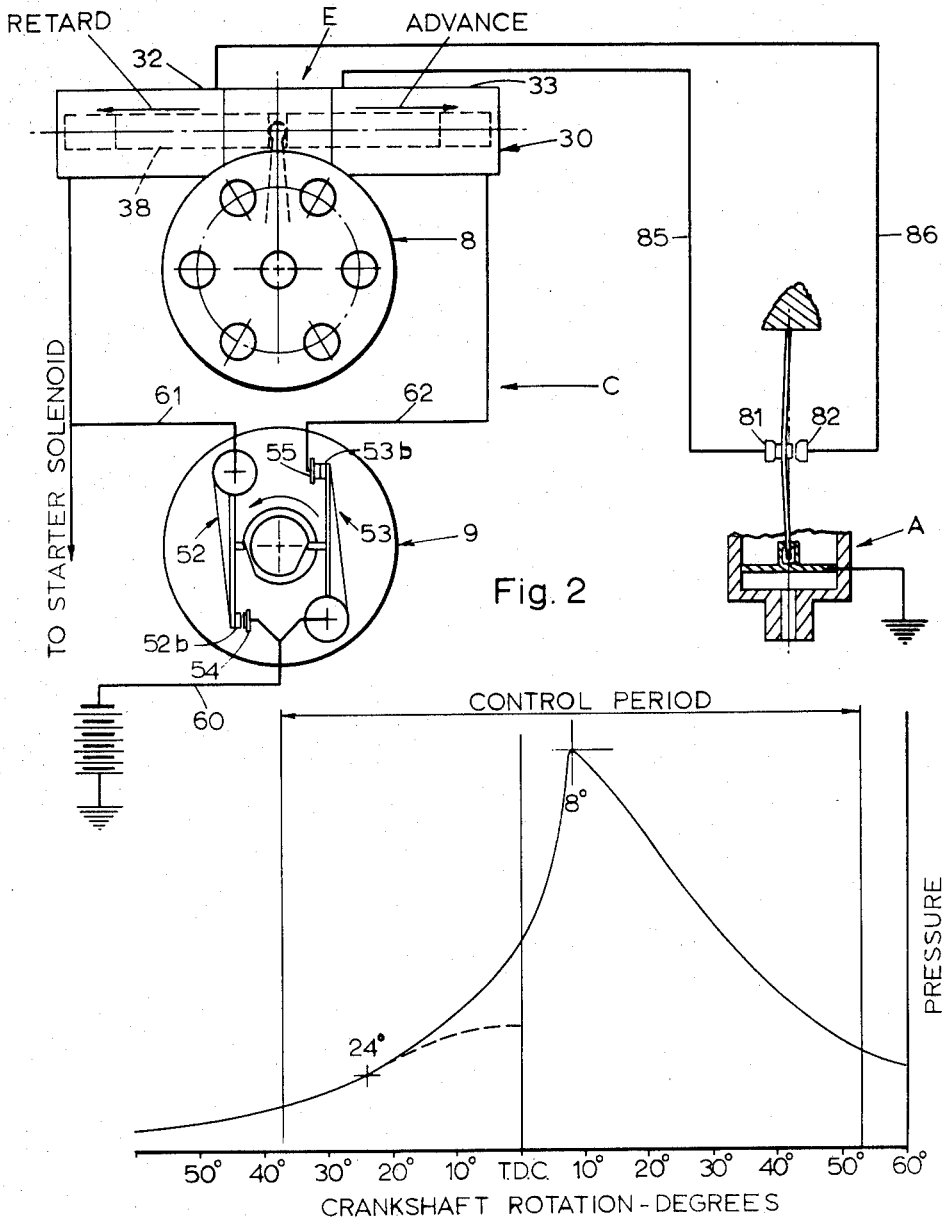

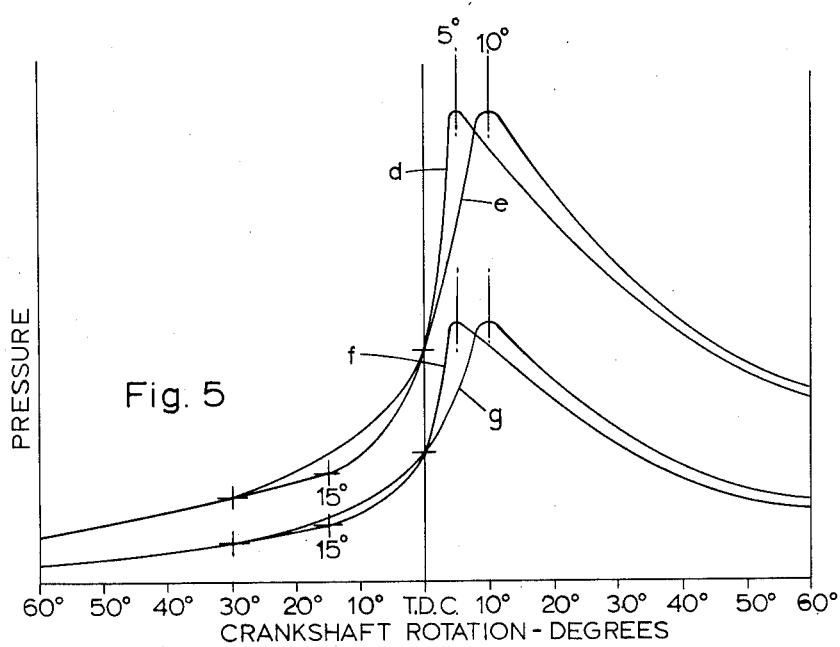
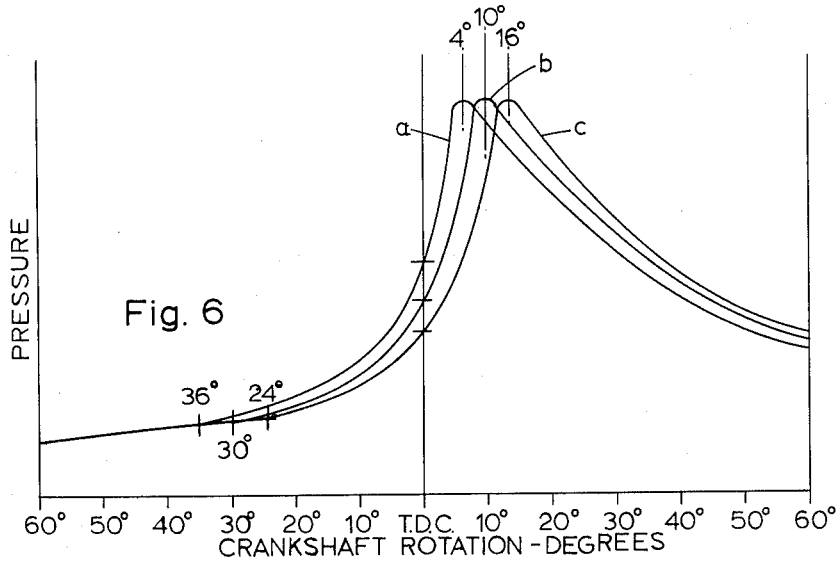

Sept. 14, 1965   E. H. HARTEL ETAL   3,205,880
COMBUSTION CONTROL SYSTEM FOR INTERNAL COMBUSTION ENGINES
Filed Aug. 25, 1961   18 Sheets-Sheet 5

INVENTORS
ERWIN H. HARTEL &
SIEGFRIED G. HARTEL
BY
Attorneys.

Sept. 14, 1965 E. H. HARTEL ETAL 3,205,880
COMBUSTION CONTROL SYSTEM FOR INTERNAL COMBUSTION ENGINES
Filed Aug. 25, 1961 18 Sheets-Sheet 10

*INVENTORS*
ERWIN H. HARTEL &
SIEGFRIED G. HARTEL
BY *Robbs & Robb*
*Attorneys.*

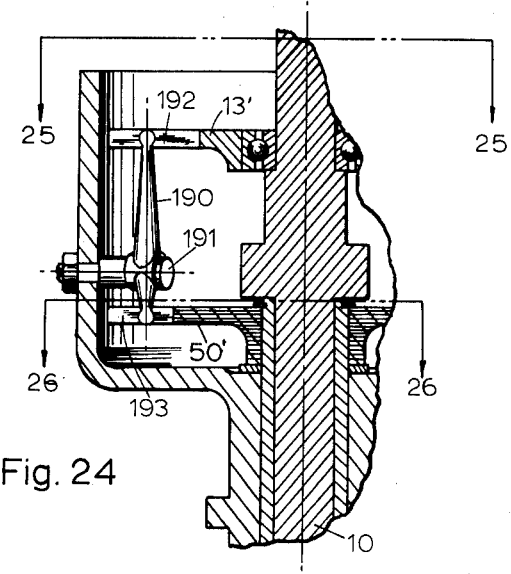
Fig. 24
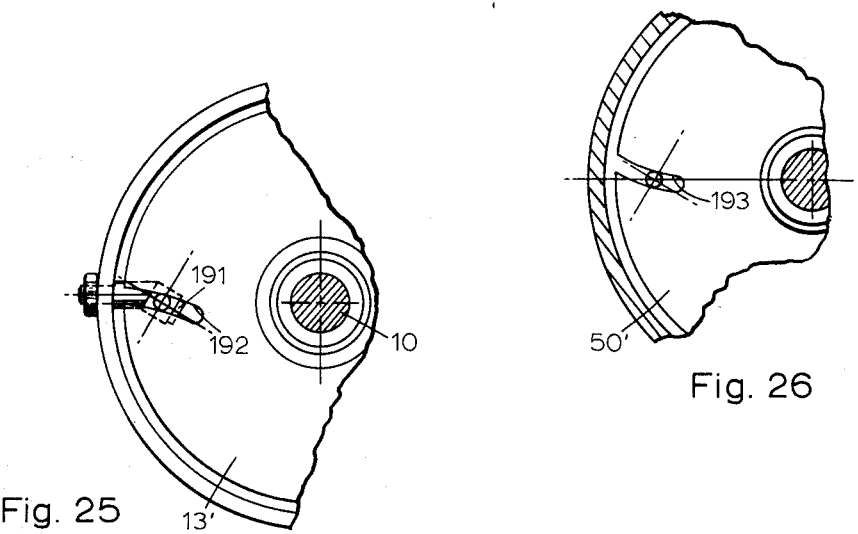
Fig. 25
Fig. 26

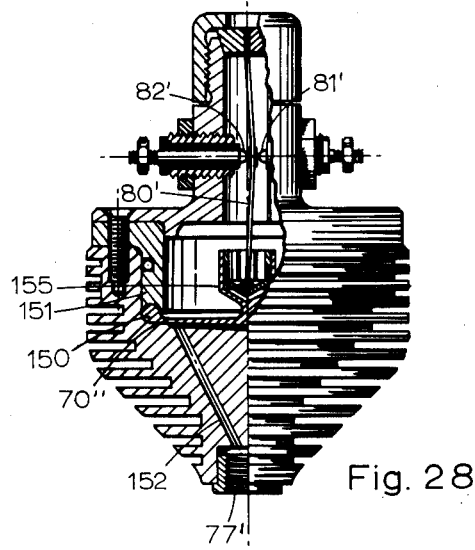
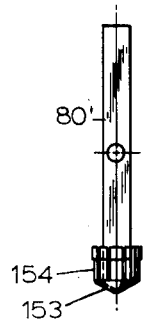
Fig. 28
Fig. 29
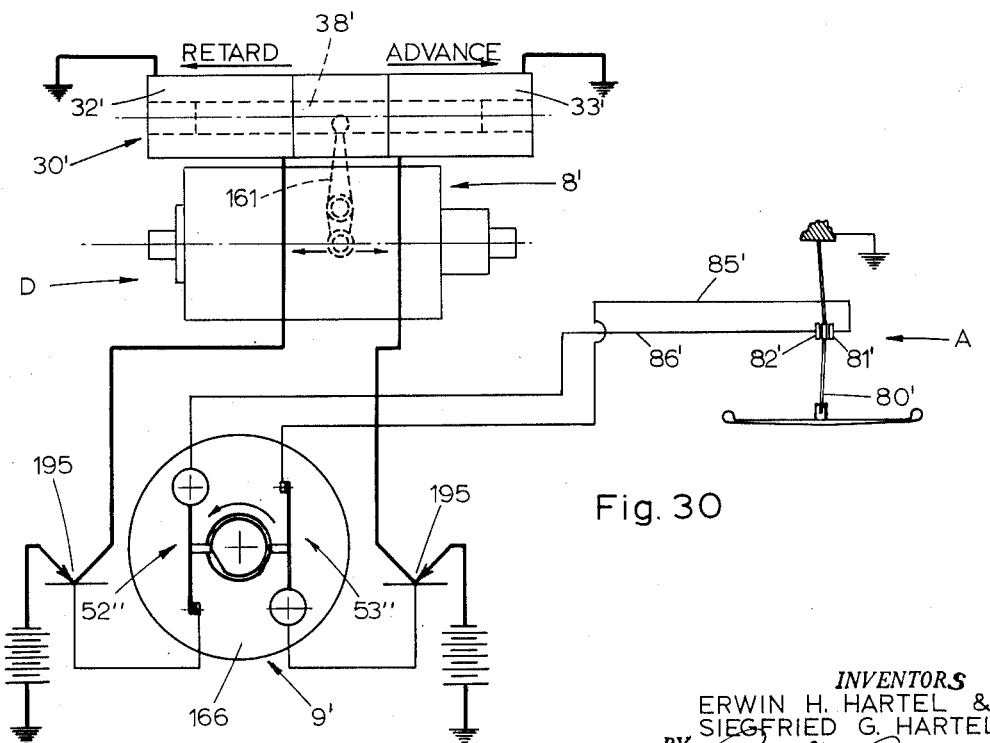
Fig. 30
INVENTORS
ERWIN H. HARTEL &
SIEGFRIED G. HARTEL INVENTORS
ERWIN H. HARTEL &
SIEGFRIED G. HARTEL
BY
Attorneys 3,205,880
COMBUSTION CONTROL SYSTEM FOR INTERNAL COMBUSTION ENGINES
Erwin H. Hartel, 7403 Ira Ave., and Siegfried G. Hartel, 7638 Alan Parkway, both of Cleveland, Ohio
Filed Aug. 25, 1961, Ser. No. 133,830
13 Claims. (Cl. 123—146.5)

This invention appertains to internal combustion engines and more particularly to a combustion control system for such engines. The invention is applicable to spark ignition type internal combustion engines as well as to other types of such engines wherein spark ignition is not used but some other means is employed for obtaining ignition or combustion of the fuel-air mixture in the combustion chambers of such engines.

In view of the applicability of the invention to such various types of internal combustion engines, the term "ignition" as used herein should be considered as referring to the beginning or initiation of the combustion cycle of the engine operation whether such commencement of the ignition cycle is effected by spark ignition means as in conventional automobile spark ignition engines or whether the commencement of the combustion cycle is initiated by other ignition means such as the injection of fuel into the combustion chamber as in the case of diesel engines.

Various difficulties are encountered in the use of presently designed combustion control or ignition systems in internal combustion engines which make it difficult to obtain maximum efficiency which is theoretically possible from such engines. In present spark ignition systems, control instrumentalities are dependent for operation upon vacuum from the carburetor and upon spring loaded centrifugal control weights. Thus such ignition control instrumentalities rely in part upon the performance of the carburetor. The method by which the vacuum is produced in the carburetor involves the employment of small jets inside the carburetor throat at the throttle valve. The small jets are quite subject to malfunctioning because of dirt lodging in the jets and in winter the formation of ice in the carburetor throat adversely affects its operation. The vacuum which acts upon a diaphragm is counterbalanced by a compression coil spring. Any tolerance in the manufacturing of this spring will reflect as an error on the accuracy of the ignition timing. This error cannot be corrected by a tune-up. The same effect of manufacturing deficiencies results in imperfect functioning of the mechanical speed advance mechanisms which consist of spring loaded centrifugal weights.

Another variable pertaining to ignition correction is the variation of combustion rate due to different atmospheric and fuel conditions. It is a well known fact that the air temperature as well as moisture content in the atmosphere has a pronounced effect upon the burning characteristics of the fuel mixture in the combustion chamber of an engine.

There are many other factors which enter into the combustion characteristics of fuel mixtures. Some of these factors include: octane rating of the fuel; compression ratio of the cylinder; temperature of the combustion chamber walls; intensity of ignition spark; ratio of fuel-air mixture; and others.

Present day ignition systems do not adjust for these factors but adjust only for variations in vacuum pressure in the carburetor and for variations in engine speed. Actual road and laboratory tests have shown that in a high performance present day automobile engine a deviation from the optimum spark setting by only 3 degrees will result in an efficiency drop of 6%.

In the light of the foregoing, it is a principal object of the present invention to provide an ignition control system which adjusts for all of the variable factors referred to and makes it possible to convert heat energy of the engine into mechanical energy to the maximum degree of efficiency under the various conditions encountered.

A further principal object of the invention is to provide an ignition control system which is designed to precisely control the ignition timing of an internal combustion engine in such a manner as to attain maximum engine performance under various operating conditions.

A further object of the invention is to provide such an ignition control system which serves through analysis of the combustion process in the engine combustion chamber to effect required adjustments of the ignition timing.

Other objects of the invention are to provide such an ignition control system which is of relatively simple construction and relatively inexpensive to manufacture, which may be installed in a simple manner and inexpensively in conjunction with engines already designed or in use, which is reliable in operation and capable of long service life without necessity for repairs, replacements, or adjustments.

Unlike other ignition control systems in use at the present time, the system of the present invention is not dependent upon mechanisms or devices which through their own partial or total malfunctioning might adversely affect the ignition timing. For example, the tolerances and errors due to manufacturing, assembly, and wear of such items as calibrated springs, centrifugal weights, and carburetors are side stepped by use of the system of the invention which is based on direct control of the ignition timing by the combustion process taking place in the engine itself. The system of this invention serves to provide corrections toward the ideal combustion process for such factors as engine temperature, air temperature, spark intensity, and other factors which affect the combustion characteristics of the fuel-air mixture.

The basic concept of this invention involves the proposition that an internal combustion engine achieves maximum efficiency when the peak pressure in the combustion chamber occurs in a certain timed relation to the time when top dead center position of the crank shaft rotation occurs. This top dead center position is referred to hereinafter as T.D.C. According to Upton's rule, maximum efficiency in an internal combustion engine is attained when the combustion pressure in the combustion chamber at the T.D.C. position of the crank shaft equals one-half the peak pressure attained during the combustion cycle. This rule, stated in another way, is that the combustion time from ignition point to T.D.C. must be three-fourths of the total combustion time, thus giving a ratio of three-to-one with respect to the time from ignition point to T.D.C. and the time from T.D.C to peak pressure in the combustion chamber (the time from ignition point to T.D.C. being three times as long as the time from T.D.C. to peak pressure). In present day high compression engines this ratio of combustion time may not hold exactly true for all engine designs. For some engine designs the ratio might be slightly different. However for purposes of explanation herein we will assume that the required ratio is 3 to 1, unless otherwise specified.

The ignition control system of the invention contemplates the provision of means directly responsive to changing engine operating conditions for automatically readjusting the ignition timing to bring the combustion cycle into conformance with a desired proportioning of the time from ignition point to T.D.C. relative to the time from T.D.C. to peak pressure.

To the foregoing end, the invention contemplates the provision of adjustable ignition timing means mechanically integrated with a control instrumentality providing a shiftable control point oriented with respect to T.D.C. position of crank shaft rotation in such fashion as to cause ignition to occur a given interval before T.D.C. having a predetermined relation to the position of the control point past T.D.C.; sensing means responsive to variation of combustion pressure in the combustion chamber for determining the position of crank shaft rotation at which peak pressure is presently occurring; and timing adjustment means responsive to a differential between the position of the control point with respect to T.D.C. of crank shaft rotation and the position at which peak pressure is presently occurring for adjusting the ignition timing means so as to effectuate coincidence of peak pressure with the position of the control point.

In carrying our invention into practice, we preferably provide a sensing unit comprising means responsive to variations in pressure in the combustion chamber and which serves to reverse polarity of a switch at the time when it changes direction of motion as peak pressure occurs in the combustion chamber. We also preferably locate the pressure take-off to the sensing unit as close as possible to the origin of combustion. Thus in the case of spark ignition engines the pressure take-off is preferably located near the points of the spark plug. This serves to eliminate adverse effects upon the sensing unit which might otherwise be caused by detonations of end mixtures in the combustion chamber and in the passages to the sensing unit.

The invention contemplates the utilization of a distributor similar to those of conventional design, suitably modified to provide solenoid operation for advancing or retarding rotation of the ignition timing means plate relative to crank shaft position, and to provide phasing control means comprising a second plate rotatable relative to the distributor shaft and carrying phasing points operative to make and break electrical switching contact at predetermined points in the rotation of the distributor shaft which is mechanically phased to the rotation of the crank shaft at a ratio of 1 to 2 in terms of rotational speed. The phasing points are arranged to switch polarity once during each revolution of the distributor shaft. The phasing control means is mechanically interconnected to the ignition timing means so that adjustment of the latter effects corresponding adjustment of the phasing control means in an opposite rotational direction with respect to the distributor shaft. The point at which the phasing points reverse polarity provides a control point which is oriented to T.D.C. position of crank shaft rotation and the phasing control means and ignition timing means are so integrated as to cause ignition to occur a given interval before T.D.C. having a predetermined relation to the position of the control point past T.D.C.

The phasing means and sensing means are interconnected with each other by means of the timing adjustment solenoids and are arranged in such fashion that if the peak pressure in the combustion chamber occurs at a different point or position of crank shaft rotation from that of the control point, then the reversal of polarity of the sensing unit switch will be out of phase with the reversal of polarity of the phasing points and under such condition the sensing unit switch will operate to cause the retard or the advance solenoid to effect an appropriate ignition timing advance or retardation until the peak pressure in the combustion cycle coincides with the control point. When this latter condition is attained the sensing unit switch and the phasing points will reverse polarity at the same time and will thus be in phase and no further ignition timing adjustment will occur unless and until there has been a subsequent change in engine operation conditions which calls for a corresponding readjustment of ignition timing which will automatically take place by the operation of the combustion control means of the invention.

In effecting the timing adjustment, the control system of the invention makes provision for satisfying the requirements of the 3 to 1 ratio specified by Upton's rule (or such other ratio as may be deemed applicable to a particular engine design). Thus, in the system of the invention disclosed herein the location of the point with respect to T.D.C. at which the polarity of the phasing points changes is not a fixed position but is one which must bear a certain relationship to the location of the ignition point in accordance with the established ratio. The system of the invention, therefore, contemplates the provision of means for readjusting the location of the polarity change position of the phasing points for every corresponding ignition timing adjustment, such means operating to effectuate an adjustment of the polarity change position of the phasing points with respect to T.D.C. position of crank shaft rotation in a desired relation to the position of the ignition point with respect to T.D.C.

Other objects, advantages and features of the invention will become apparent from the following detailed description taken in conjunction with the accompanying drawings in which:

FIGURE 2 is a schematic view of a control system embodying the invention.

FIGURE 3 is a pressure curve illustrating a combination cycle conforming to Upton's rule.

FIGURE 5 shows pressure curves illustrative of the operation of the invention, the two upper curves respectively illustrating the combustion cycles at the same constant high manifold pressure but at two different engine speeds, and the two lower curves illustrating respective combustion cycles at the same constant low manifold pressure but at two different engine speeds, in all cases the combustion cycles conforming to Upton's rule.

FIGURE 6 shows pressure curves illustrating the operation of the invention, showing the manner in which the control means of the invention serves to adjust the ignition timing for a given engine operating condition.

Figure 7:
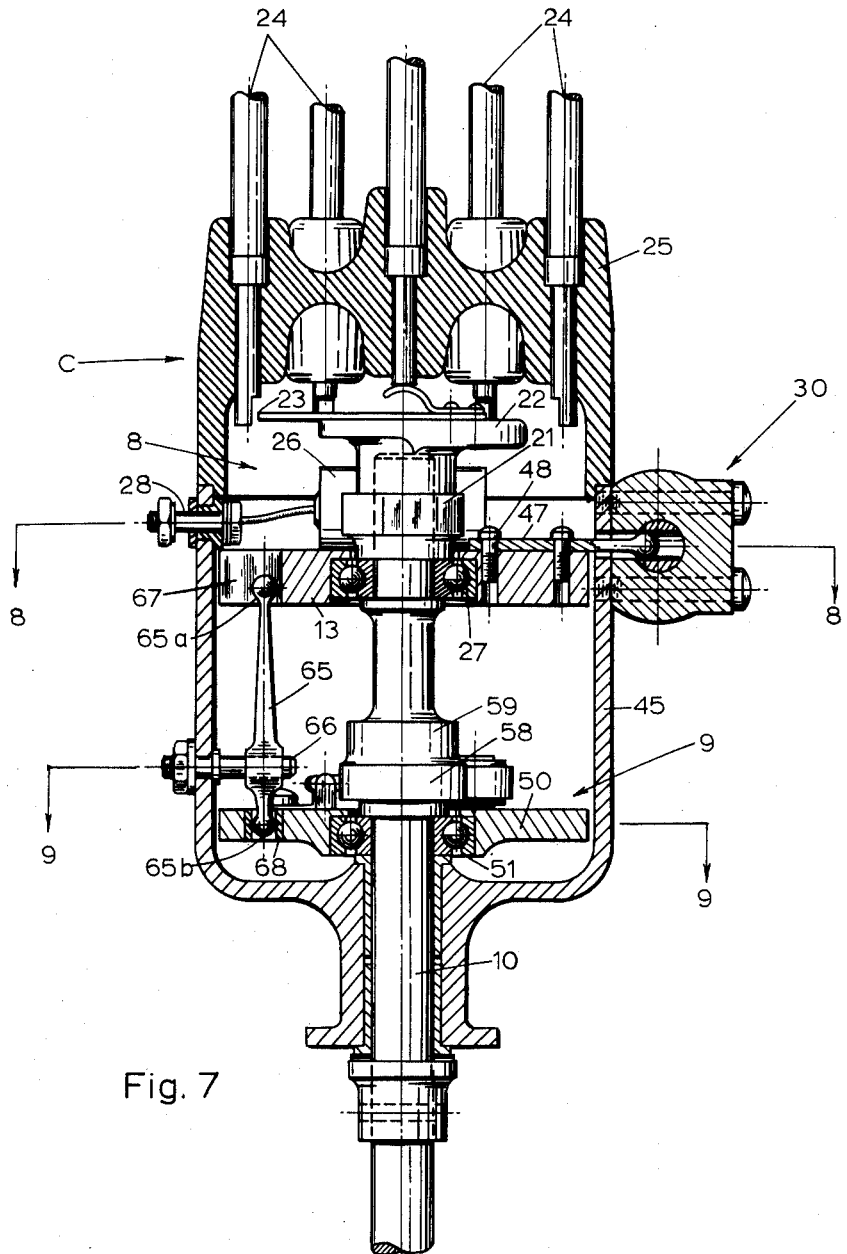

FIGURE 7 is a section through a distributor embodying the invention.

Figure 8:
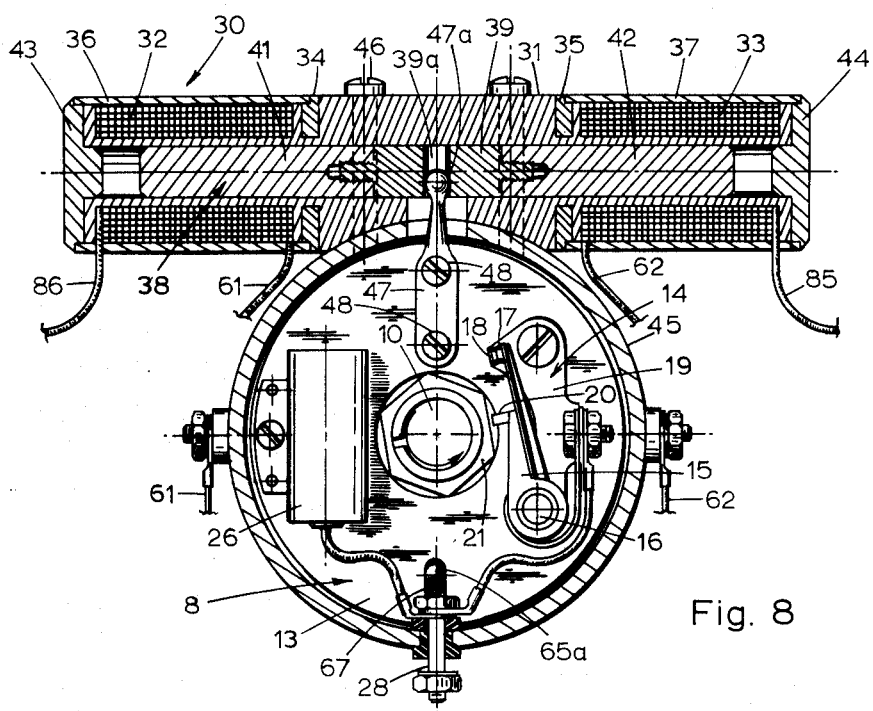

FIGURE 8 is a sectional view taken substantially on the line 8—8 of FIGURE 7.

Figure 9:
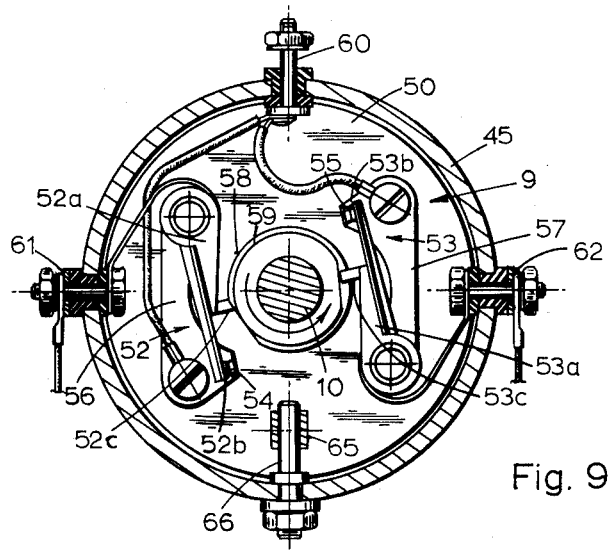

FIGURE 9 is a sectional view taken substantially on the line 9—9 of FIGURE 7.

Figure 10:
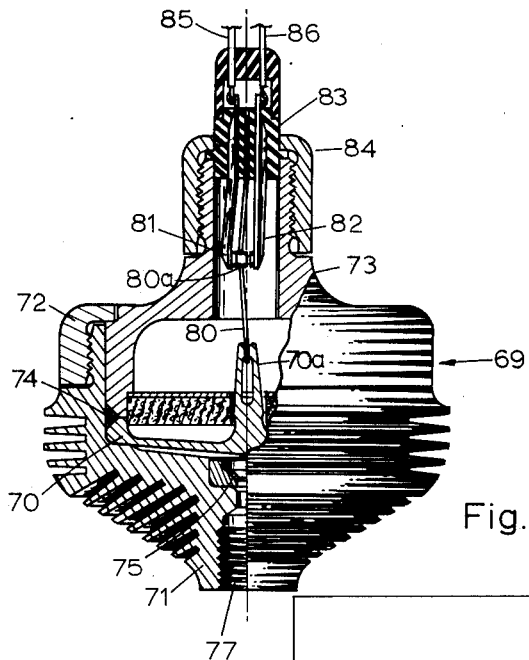

FIGURE 10 is a view partly in section of a sensing device embodying the invention.

Figure 11:
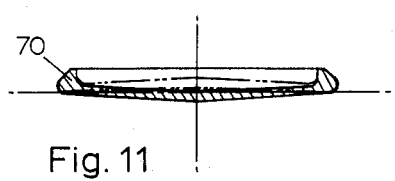

FIGURE 11 is a sectional view illustrating the diaphragm configuration of the sensing unit of FIGURE 10.

Figure 12:
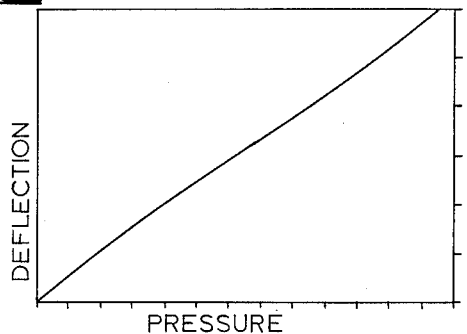

FIGURE 12 illustrates the deflection curve of the diaphragm of the sensing unit of FIGURE 10 plotted against pressures to which the diaphragm is subjected.

Figure 13:
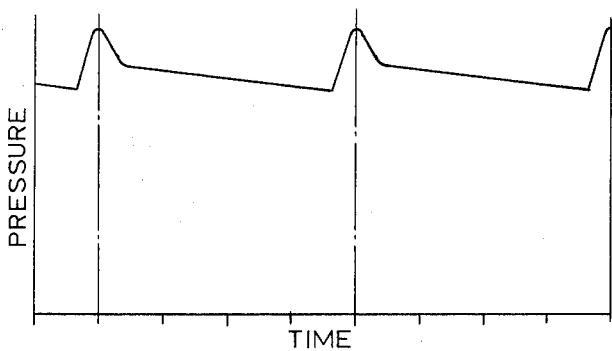

FIGURE 13 is a pressure time curve showing a trace of the pressure acting against the diaphragm of the sensing unit of FIGURE 10.

Figure 14:
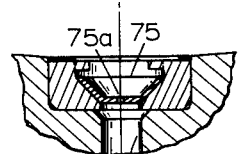

FIGURE 14 is a detail sectional view on an enlarged scale showing the check valve for controlling entrance of gases into the diaphragm chamber.

Figure 15:
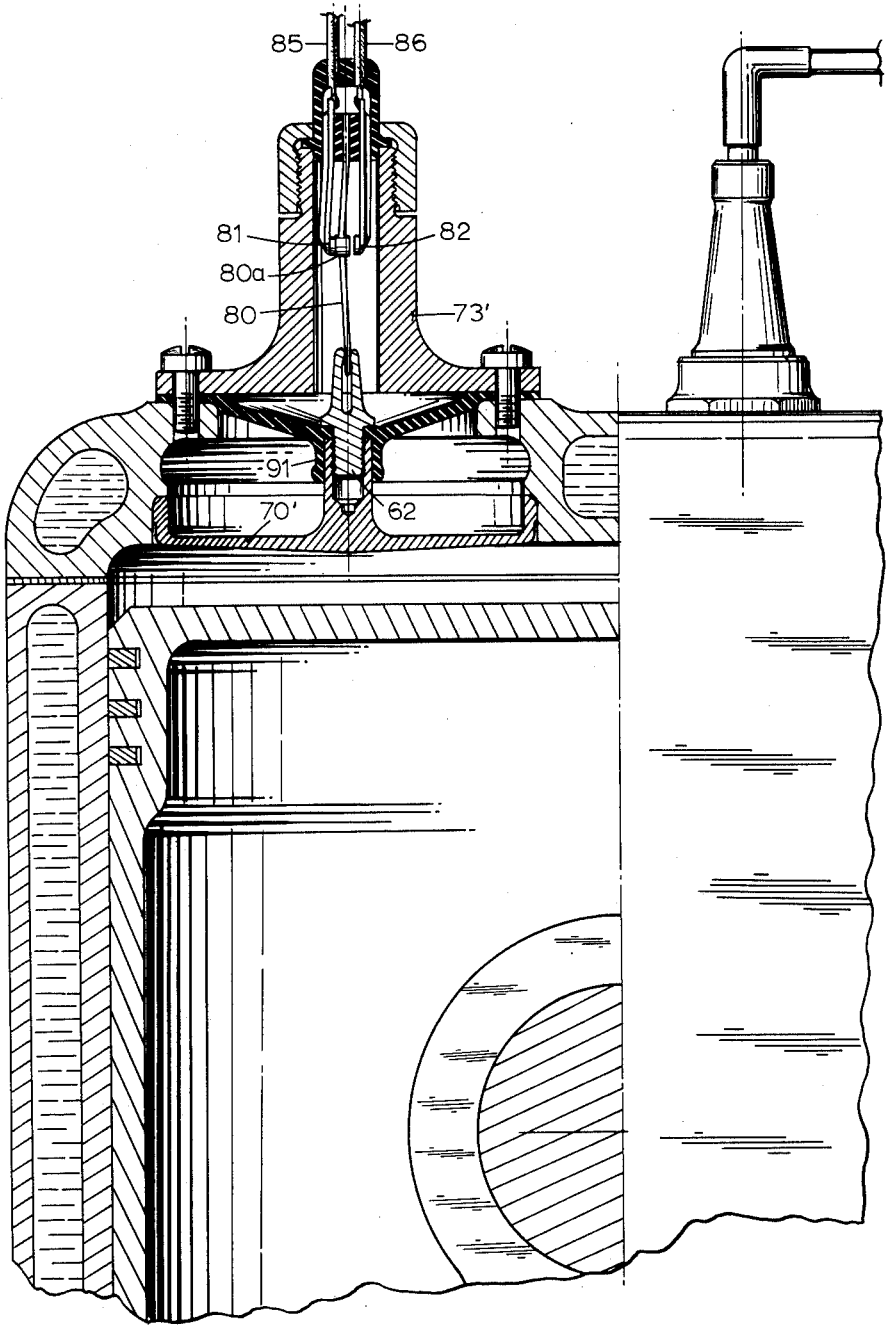

FIGURE 15 is a sectional view through a portion of an internal combustion engine disclosing a modified form of sensing unit.

Figure 16:
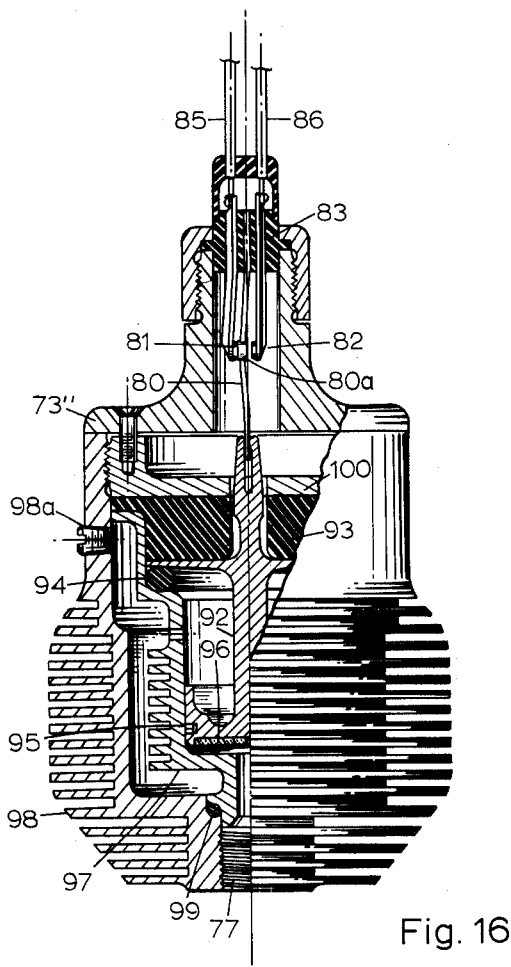

FIGURE 16 is a view partly in section showing a further modified form of sensing unit.

Figure 17:
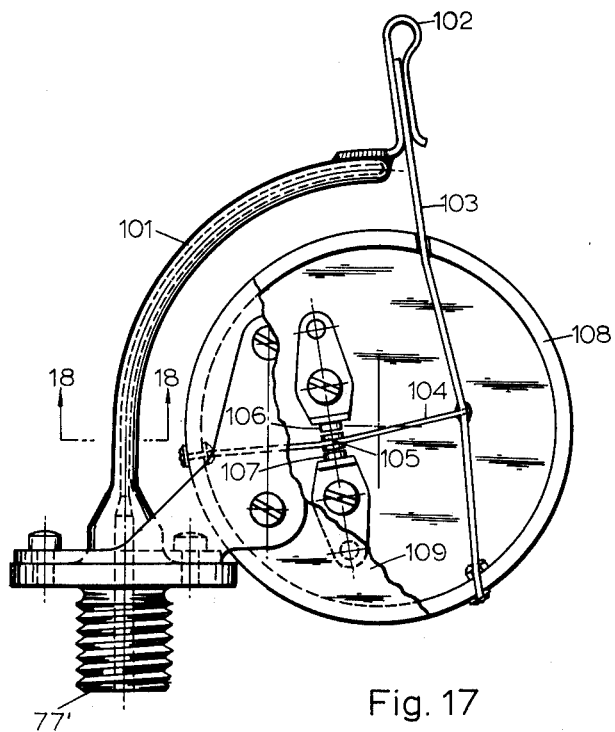

FIGURE 17 is a view showing still another modified form of sensing unit.

Figure 18:
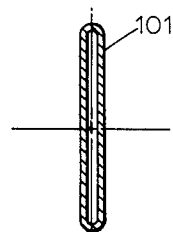

FIGURE 18 is a cross-section taken substantially on the line 18—18 of FIGURE 17.

Figure 19:
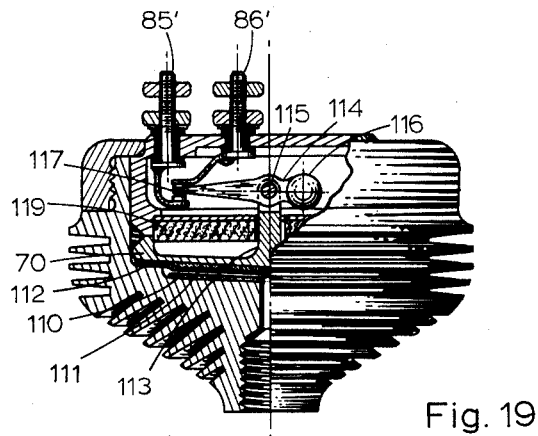

FIGURE 19 is a view partly in section illustrating still another modified form of sensing unit.

Figure 20:
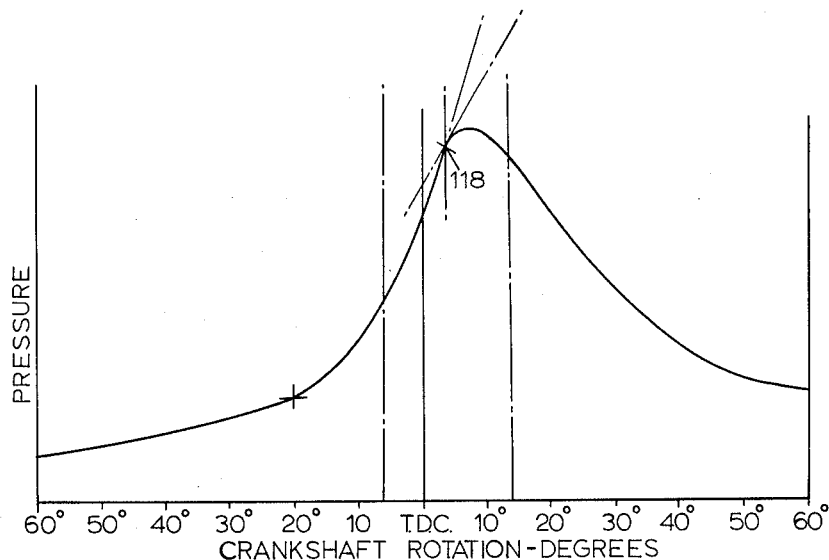

FIGURE 20 shows a pressure curve illustrating operation of sensing unit of FIGURE 19.

Figure 21:
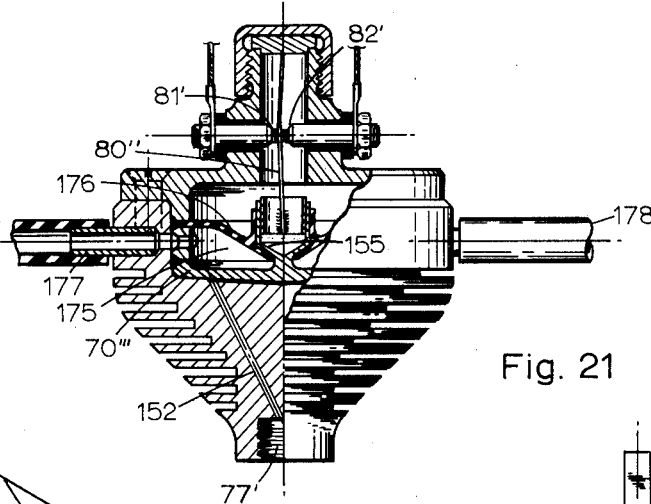

FIGURE 21 is a view partly in section showing still another modified form of sensing unit.

Figure 22:
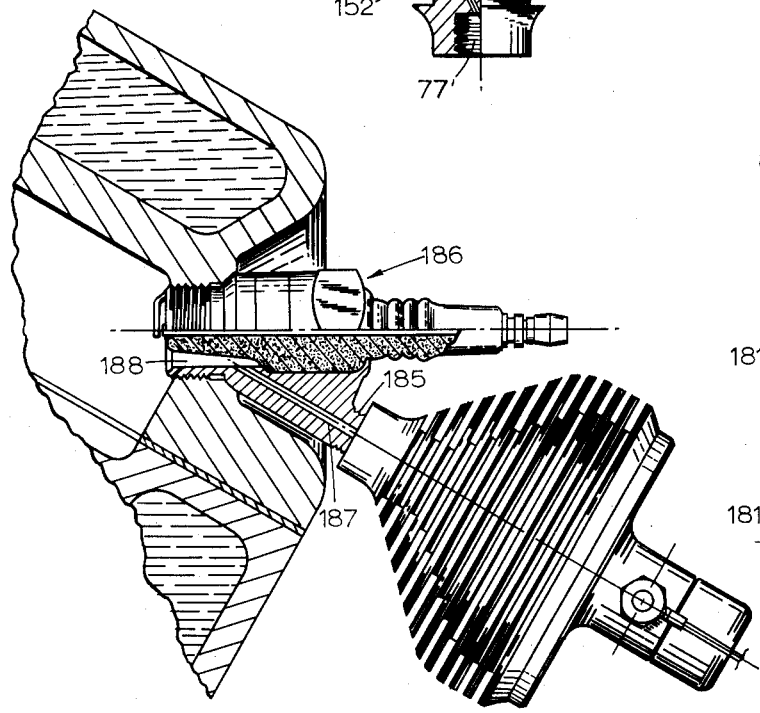

FIGURE 22 is a view partly in section showing a portion of an engine cylinder illustrating a sensing unit incorporated with a spark plug and showing the mounting thereof with respect to the cylinder.

Figure 23:
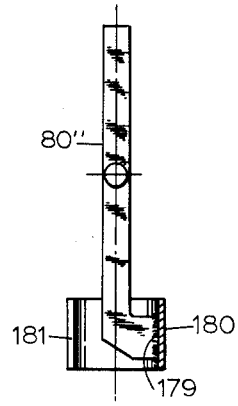
Figure 23A:
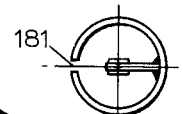

FIGURES 23 and 23A are respectively a vertical sectional view and a bottom plan view of the leaf switch unit employed in the sensing unit of FIGURE 21.

FIGURE 24 is a detail sectional view of the distributor as in FIGURE 7 but showing a modification in reference to the ratio means whereby to provide a variable ratio in respect to the adjustment of the ignition timing plate relative to the adjustment of the phasing points plate.

FIGURE 25 is a view taken substantially on the line 25—25 of FIGURE 24.

FIGURE 26 is a sectional view taken substantially on the line 26—26 of FIGURE 24.

Figure 27:
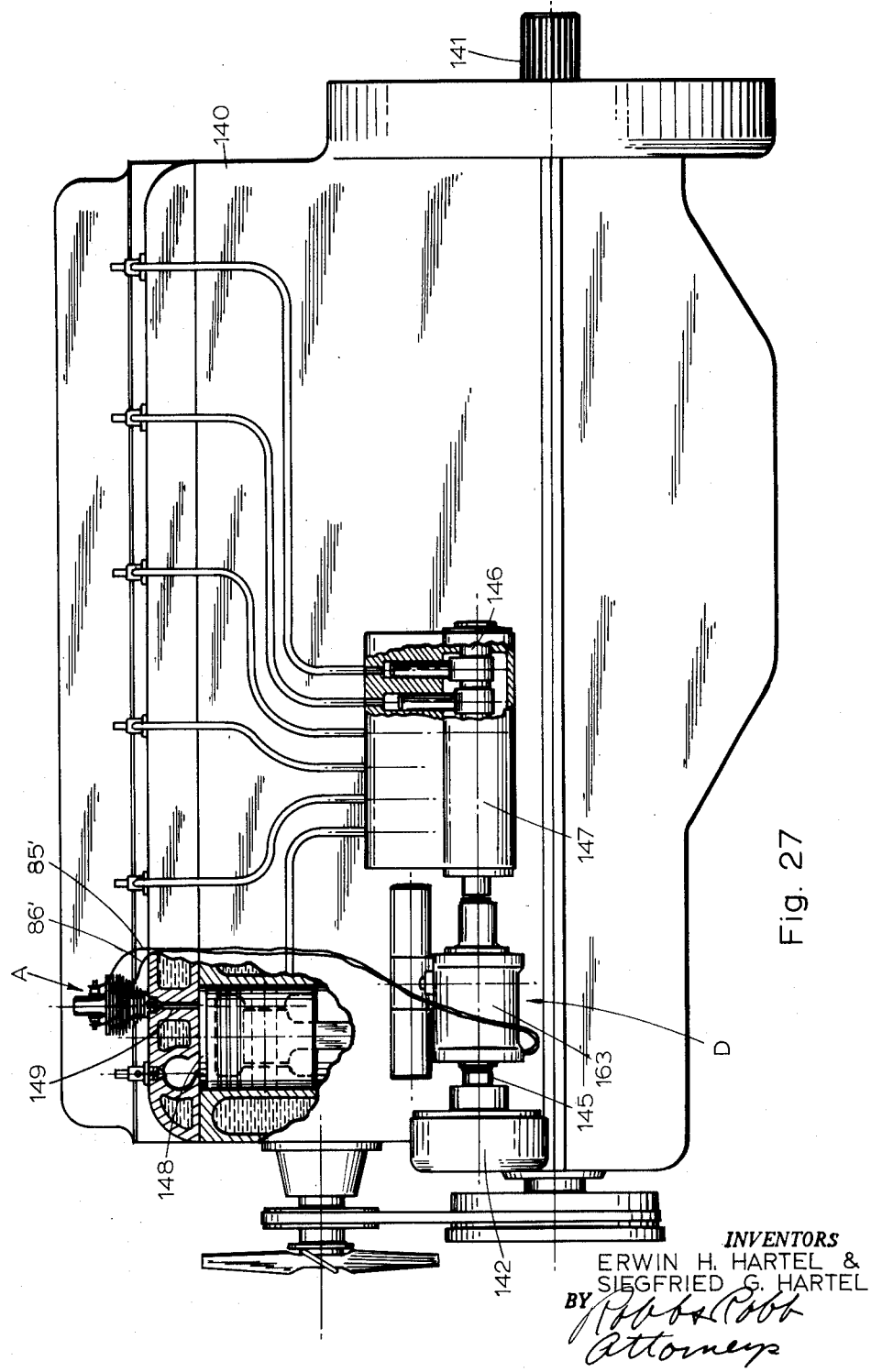

FIGURE 27 is a side elevation of a diesel engine, a portion being shown in section, illustrating an embodiment of the invention applied thereto.

FIGURE 28 is a view partly in section showing the sensing unit employed in the diesel application of the system.

FIGURE 29 is a detail view of the leaf switch unit employed in the construction of FIGURE 28.

FIGURE 30 is a schematic view illustrating the diesel application of the system of the invention.

Figure 31:
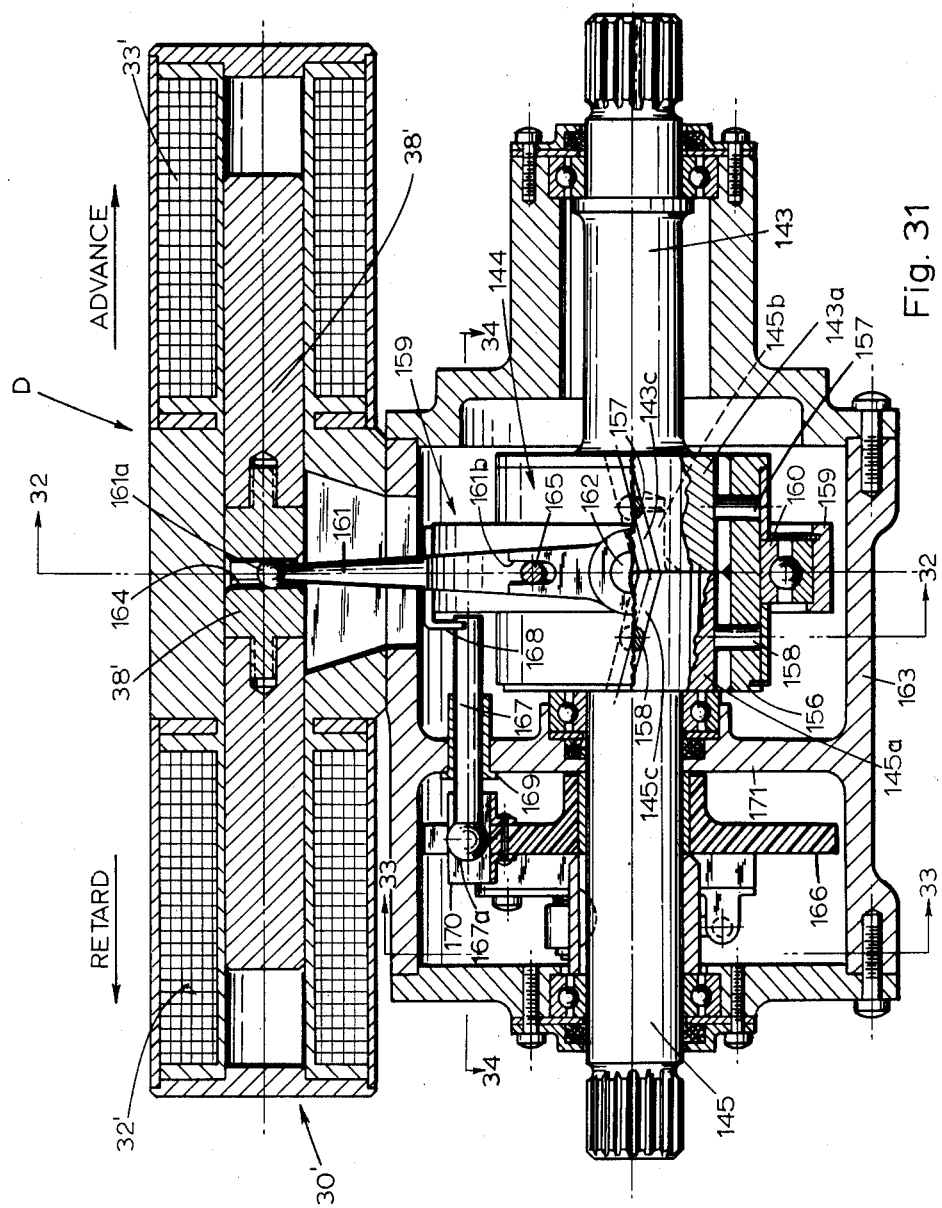

FIGURE 31 is a sectional view through the timing instrumentalities of the diesel application of the system as in FIGURE 27.

Figure 32:
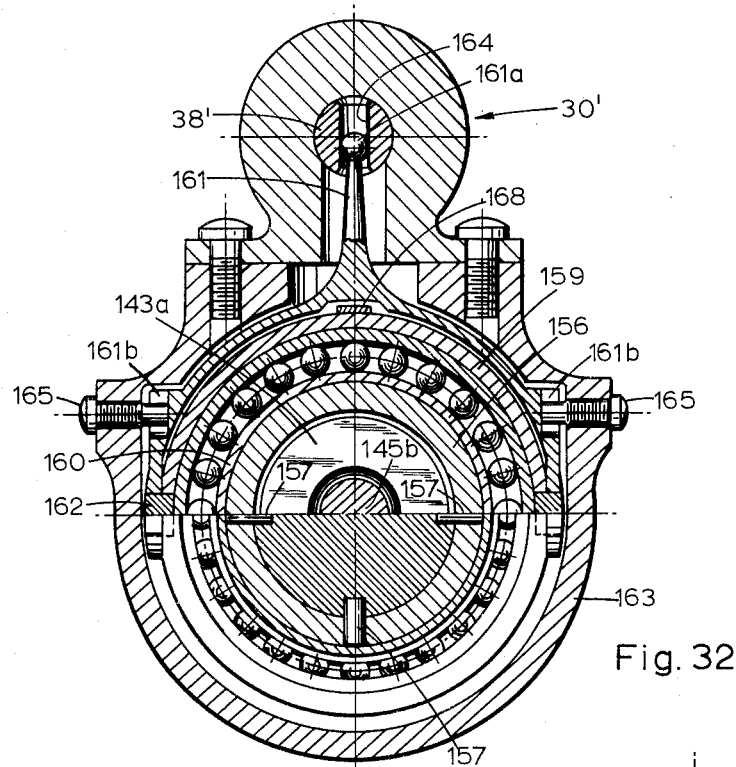

FIGURE 32 is a sectional view taken substantially on the line 32—32 of FIGURE 31.

Figure 33:
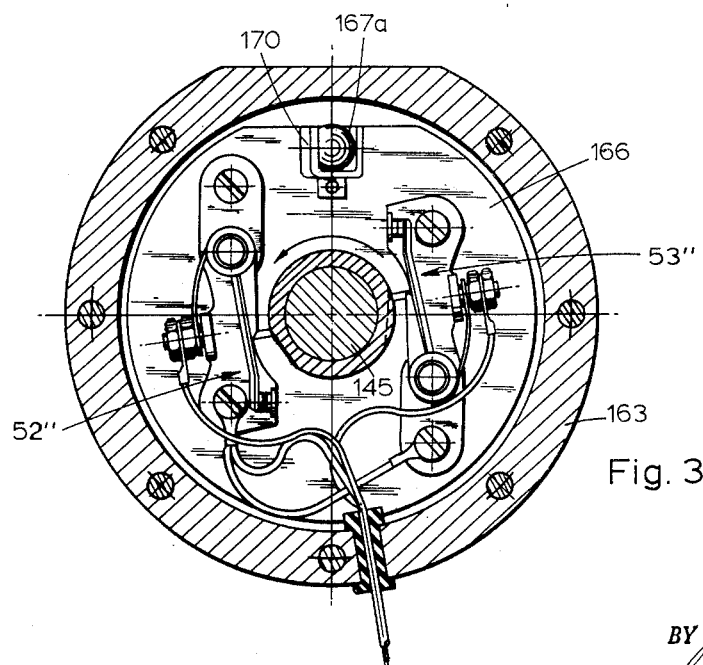

FIGURE 33 is a sectional view taken substantially on the line 33—33 of FIGURE 31.

Figure 34:
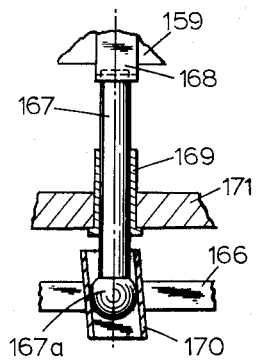

FIGURE 34 is a sectional view taken substantially on the line 34—34 of FIGURE 31.

Figure 35:
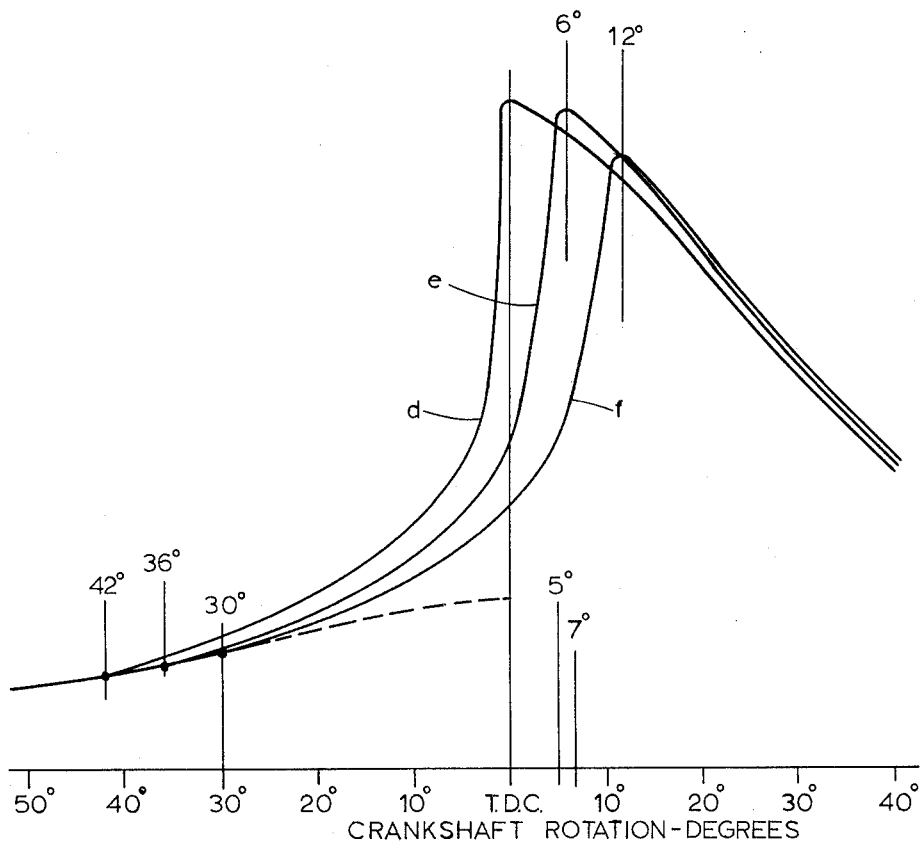

FIGURE 35 shows curves illustrating the operation of the invention as related to fuel injection timing.

Now referring to the drawings for a detailed description, reference is first made to FIGURE 3 for understanding of the application of Upton's rule. The rule is that maximum efficiency is attained in an internal combustion engine when the peak pressure at T.D.C. of crank shaft rotation equals one-half of the peak combustion pressure subsequently attained during the combustion cycle. Stated in another fashion, the rule is that the time from the ignition point to T.D.C. should be three-fourths of the total time from ignition point to peak pressure. This is illustrated in FIGURE 3 which shows time measured in degrees of crank shaft rotation and illustrating the optimum condition wherein the engine is designed to attain optimum performance when peak pressure in the combustion chamber occurs at 8 degrees past T.D.C. Under such condition, as illustrated in FIGURE 3, the ignition point should occur at 24 degrees before T.D.C. to provide the three-to-one ratio specified by Upton's rule where the time for ignition point to T.D.C. is three times that of the time from T.D.C. to peak pressure.

It should be understood that the rule applies irrespective of the point at which optimum peak pressure should occur in engines of different design. For example, an engine designed to have optimum peak pressure occur at 5 degrees past T.D.C. should have its ignition point occur at 15 degrees past T.D.C. to accord with the rule.

It should also be further understood that the exact ratio of three-to-one may not exactly hold true for all engine designs but may vary slightly as for example 3.2 to 1 or some similar ratio approaching the generality of the three-to-one ratio according to Upton's rule. For purposes of illustration herein we will assume that the three-to-one ratio is applicable, noting that the system of the invention is capable of adjusting thet ignition timing to cause peak pressure in the combustion cycle to occur at any desired point in accordance with any desired ratio applicable to the particular engine design.

It should be further understood that when we speak of the engine being designed to have its peak pressure occur in the combustion cycle at a particular position of crank shaft rotation past T.D.C., we are talking about the optimum condition at a specific engine operating condition, noting that the position of crank shaft rotation at which optimum peak pressure should occur changes in accordance with variations in manifold pressure and engine speed. Thus for example when the manifold pressure is reduced at constant engine speed the ignition point should be advanced and the peak pressure caused to occur later in the combustion cycle in accordance with the predetermined ratio. Conversely, when the manifold pressure is increased at constant engine speed the ignition point should be retarded and the peak pressure caused to occur earlier in the combustion cycle in accordance with the predetermined ratio. The control system of the invention automatically effects the necessary correction for every changed throttle setting, and for every changed engine condition, in accordance with the foregoing.

Referring now to FIGURES 1, 2, 7, 8 and 9, the control system of the invention is shown applied to a spark ignition type internal combustion engine. In this application, a sensing unit generally designated by the letter A is mounted on the engine generally designated by the letter B so as to be in communication with the combustion chamber of one of the cylinders designated 1 of the engine B which is of conventional design having the usual crank shaft 2 having secured thereto for rotation therewith respective crank arms 3 for operation of the piston 4 of each cylinder, each crank arm 3 being pivotally connected by a respective crank pin 5 to a respective crank link 6 which in turn is pivotally connected as at 7 to the respective piston 4 for reciprocatory movement of the piston 4 within the cylinder 1 upon rotation of the crank shaft 2.

In the application now being described, the control system utilizes a distributor generally designated by the letter C somewhat similar to those of conventional construction but suitably modified to provide adjusting means generally designated E for the ignition timing means generally designated by the numeral 8 and to provide phasing control means generally indicated by the numeral 9. The distributor includes the distributor shaft 10 having at one end a gear 11 fixed thereto which meshes with gear 12 fixed to the crank shaft for rotation of the distributor shaft 10 at one-half the speed of rotation of the crank shaft 2.

The ignition timing means 8 comprises a circular plate 13 upon which the usual ignition breaker points generally designated by the numeral 14 are mounted, the same including an arm 15 pivotally mounted on pin 16, said arm carrying a contact 17 engageable with contact 18 carried by contact plate 19, the arm 15 being spring biased to normally effect engagement of contacts 17 and 18. Arm 15 carries a finger 20 engageable with cam 21 fixed to distributor shaft 10 for rotation therewith and suitably configured to effect engagement and disengagement of the contacts 17 and 18 at equidistantly spaced intervals in the rotation of the distributor shaft 10 for causing spark ignition firing of each cylinder of the engine in a predetermined order as determined by rotation of the distributor arm 22 fixed to the distibutor shaft 10 and having the usual contact 23 for successive contact with the respective spark plug leads 24 extending through the distributor cap 25 and leading to the spark plugs of the respective cylinders of the engine B all in conventional manner.

The plate 13 has mounted thereon the usual condenser 26. The plate 13 is mounted to the distributor shaft 10 for rotation of the shaft 10 relative to the plate 13 by means of the ball bearing 27.

The electrical terminal 28 is the current intake into the ignition breaker points from the ignition coil. The breaker points are grounded and thereby represent the end of the ignition circuit.

The construction of the distributor as thus far described is conventional.

In accordance with the present invention, the ignition timing plate 13 carrying the breaker points 19 is rotatably adjusted relative to the distributor shaft 10 by means responsive to a signal from the sensing unit A under control of the phasing control means 9 for advancing and retarding rotation of the timing plate 13 relative to the distributor shaft 10. For this purpose the ignition timing adjusting means E may comprise a solenoid generally designated by the numeral 30 for effecting advancing and retarding rotation of the timing plate 13 relative to the distributor shaft 10. The solenoid 30 comprises a body 31 made of non-magnetic material. Two magnetic coils 32 and 33 are wound on to the solenoid body. Two-piece discs 34 and 35 are slipped into slots in the body 31. Tubes 36 and 37 are slipped over the solenoid coils and partially over parts 34 and 35 in order to keep them in place. The solenoid armature generally designated by the numeral 38 comprises a central part 39 made of non-magnetic material and has its ends threaded into armature parts 41 and 42 which are made of magnetic material. The parts 43 and 44 are pressed into the solenoid body 31 and secure the parts 36 and 37. The parts 34, 35, 36, 37, 43 and 44 are also made of highly magnetic material. The solenoid assembly is attached to the distributor body 45 by screws 46.

An arm 47 is attached to plate 13 by screws 48. Arm 47 has a spherical end 47a which fits into a hole 39a machined into the part 39, the arm 47 extending through suitable openings through the distributor housing 45 and through the solenoid body 31. Thus ignition timing adjustment is effected by sliding movement of the armature 38 within the solenoid body 31 in one direction or the other to correspondingly rotate plate 13 relative to distributor shaft 10 to advance or retard the ignition depending on which of the solenoid coils is energized.

The phasing control means 9 of the invention has been incorporated as a part of the distributor C. This phasing control means comprises a circular plate 50 which is mounted to the distributor shaft 10 by means of the ball bearing 51 for rotation of the shaft 10 relative to plate 50. Mounted on the plate 50 are two sets of breaker points 52 and 53 similar to the breaker points 14 previously described, the breaker points 52 and 53 being referred to herein as the phasing points. These phasing breaker points 52 and 53 each include a respective pivoted arm 52a and 53a having thereon respective contact points 52b and 53b for engagement with respective contact points 54 and 55 carried by the respective contact plates 56 and 57, the arms 52a and 53a being spring biased to normally effect engagement of the contacts 52b with 54 and 53b with 55.

Each of the pivoted contact arms 52a and 53b has a respective cam engaging finger 52c and 53c for engaging respective cams on the distributor shaft 10. The phasing breaker point assembly 52 is mounted lower so that its finger 52c operates off the lower cam 58 while the breaker point assembly 53 is mounted higher so that its finger 53c operates off the higher cam 59, the said cams being secured to the distributor shaft 10. Plate 50 is made of an electrical insulating material.

The arrangement of the two phasing breaker point assemblies in relationship to their respective cams is such that the phasing points 52 will start to open at the same instant when the phasing points 53 start to close. Terminal 60 is the electrical inlet and terminals 61, 62 are the electrical outlets.

According to the invention, means is provided whereby any rotational adjustment of the ignition timing plate 13 will effect a corresponding rotational adjustment of the phasing control plate 50 in an opposite rotational direction and in a ratio of three units of distance of rotational movement of the plate 13 to one unit of distance of rotational movement of the plate 50 in the opposite rotational direction, thereby effectuating the 3 to 1 ratio specified by Upton's rule. It is noted of course that the required ratio may be altered according to the requirements of different engine designs and that the mechanical means for effectuating this ratio as herein described may likewise be altered to produce the desired ratio.

As shown in FIGURES 7, 8 and 9 the mechanical means for effectuating the desired ratio of opposite rotational movement of the plates 13 and 50 may be accomplished by the provision of a lever 65 pivotally mounted on pin 66 for rotational movement of the lever 65 around the axis of the pin and for sliding movement of the lever along the axis of the pin. The upper spherical end 65a of the lever fits into a slot 67 machined into the plate 13. The lower spherical end 65b of the lever fits into a bushing 68 seated in an opening in the plate 50.

For the purposes hereof, we may consider that the lever ratio is 3 to 1 which means that if plate 13 is rotated 3 degrees in a clockwise direction then the plate 50 will be caused to rotate 1 degree in a counterclockwise direction. The ratio of rotational movement of the plates 13 and 50 can be changed as desired by suitably changing the lever ratio.

*The sensing unit*

The sensing unit A may assume various forms within the scope of the invention, as illustrated in FIGURES 10 through 22 inclusive and FIGURE 31. The principal purpose of the sensing means is to trace the pressure curve or combustion pressure within the combustion chamber and to provide an electrical signal at the point of peak pressure.

The various forms of sensing units herein disclosed all involve the provision of a member which is uniformly movable in response to pressure variations, the motion being then utilized to actuate an electric switch. The electrical switches for this purpose may assume different forms, two different forms being illustrated in the drawings as exemplary. One type of such switches may be referred to as the bent leaf type such as illustrated in FIGURES 10, 15, 16, 17, 21 and 28. The other type of switch illustrated in the drawings may be referred to as the dynamic type, an illustration being found in FIGURE 19.

Referring now to FIGURE 10 there is shown a sensing unit which uses a diaphragm 70 as the deflecting member. This unit has been tested extensively and has been found to have good pressure tracing characteristics since the moving mass of the diaphragm is relatively small in respect to its reaction surface to the pressure.

The diaphragm 70 is contained inside of the housing 71. The nut 72 presses down on the switch housing 73 which in turn presses down on the diaphragm 70. The lower edge of housing 73 and the diaphragm 70 form a triangle at the surface where they contact with an O-ring type seal 74. This seal traps the gas pressure under the diaphragm. The diaphragm has integral friction fingers 70a which are disposed centrally of and integral with the diaphragm plate 70. Making the fingers integral with the diaphragm plate eliminates any stress concentrations in the center thereof which might otherwise be produced by the provision of a hole or any other abrupt contour change. The stresses are maximum in the center of the diaphragm plate which is the reason for the taper of the plate thickness.

A special concept of design has been applied in determining the proper dish of the diaphragm plate in the undeflected shape as illustrated in FIGURE 11. The desired feature is to arrive at a diaphragm shape which will produce a constant deflection increase with a corresponding constant pressure increase. The curve shown in FIGURE 12 has been traced from actual deflection test data in a sensing unit of the construction of FIGURE 10 utilizing the diaphragm 70 shown therein. The nearly constant deflection curve (almost a straight line) is necessary in order for the unit to have uniform accuracy throughout the entire pressure range.

A check valve 75 (FIGURES 10 and 14) is located at the entrance to the pressure chamber just below the diaphragm 70. This check valve is seated on a suitable seat provided at the upper end of a restricted passage 76 communicating with the larger threaded passage 77 which in turn communicates through a suitable hollow plug 78 with a passage 79 through the cylinder head communicating with the combustion chamber within the cylinder 1 (see FIG. 1). As indicated, the threaded plug 78 may be threaded into the passage 79 and the interiorly threaded passage 77 of the unit 69 may be screwed onto the plug 78.

As seen best in FIGURE 14, the check valve 75 may be provided with a small hole 75a therethrough. The arrangement of the check valve 75 is such that it will allow gases from the combustion chamber to enter the diaphragm chamber below the diaphragm freely but will restrict the flow of gases out of the diaphragm chamber by virtue of the seating tendency of the check valve against the pressure of such outflow which is thereby restricted to passage only through the small hole 75a. Thus most of the gas passing from the cylinder combustion chamber to the diaphragm chamber below the diaphragm is trapped in the latter chamber between each new pressure increase in the combustion chamber. A trace of the pressure in the diaphragm chamber acting against the diaphragm 70 will look like the curve shown in FIGURE 13. The advantage of this feature is that the pressure sensing unit will remain cooler and the fatigue life of the diaphragm is extended since each cycle of deflection does not involve the entire range of deflection of which the diaphragm is capable.

Within the unit 69 there is provided a switch comprising a bent leaf 80 provided with a contact 80a for engagement with one or the other of the stationary contacts 81 and 82. The upper end of the bent leaf 80 is anchored in an insulation block 83 which is secured to the unit by means of a nut 84.

The friction fingers 70a engage the lower end of the bent leaf 80. An upward motion of the fingers 70a due to deflection of the diaphragm 70 will cause the fingers to slide up on the leaf 80. As this happens, a friction force is applied to the leaf 80 tending to move it upwardly. However since the leaf 80 is anchored in the insulation block 83 the upper end is thereby stationary and the friction force of the fingers 70a on the leaf 80 will tend to bend it even further from a straight line since the friction force is upward. Thus contact 80a will engage contact 81 as long as the motion of the diaphragm 70 is an upward deflection due to pressure increase in the combustion chamber of the cylinder 1. However when the peak pressure is reached and the pressure starts to drop, the motion of the diaphragm reverses to a downward direction. This will result in a downward friction force on the leaf 80 which will tend to straighten the leaf and consequently contact will be broken with point 81 and the contact 80a will thereupon engage contact 82. This is the method by which the sensing unit reverses contact from wire 85 to wire 86 at the instant the peak pressure in the combustion chamber of the cylinder 1 is attained. By actual test it has been found that the sensing unit is sensitive enough to reverse contacts at a pressure drop of 3 pounds per square inch.

FIGURE 15 shows another diaphragm version of the pressure sensing unit which is basically similar to that of FIGURE 10 except that it is built into the cylinder head so that the diaphragm is directly exposed to the pressure in the combustion chamber and actually forms a portion of the combustion chamber. In this modification the chamber above the diaphragm 70' is filled with water for cooling and the rubber diaphragm 91 is provided to keep the water out of the switch housing 73'.

FIGURE 16 shows a sensing unit which employs a piston 92 as the deflecting member. A rubber bumper member 93 is arranged so as to react against the gas pressure acting on the piston. A rubber ring 94 is arranged so as to prevent metal to metal contact when the pressure drops to zero as the piston goes into extreme downward position. Any metal to metal contact under such condition would produce noise. Piston rings 95 installed on the lower piston head serve to seal against leakage of gas. A part 96 on the lower piston head is made of heat insulating material and serves the purpose of preventing excessive heat flow from the gas into the piston body. Part 97 may be made of steel and forms the cylinder for the sliding piston 92. The housing 98 may be made of aluminum and partially filled with oil through port 98a. The oil is used to lubricate the sliding piston and also to transfer heat from the cylinder 97 to the housing 98. The O-ring type seal 99 prevents any oil loss at the lower end of the assembly. Part 100 is the back up plate for rubber bumper 93.

FIGURE 17 discloses a pressure sensing unit comprising a flattened curved tube 101 suitably secured to a threaded nipple 77' for communication with the combustion chamber of the cylinder 1 of an engine whereby to admit gas pressure from the combustion chamber into the interior of the tube 101. As the pressure enters the flat and curved portion of the tube 101 the latter will tend to straighten out and thereby produce a motion at the end thereof. This motion is used to actuate an electric switch. A spring clip 102 secured to the end of the tube 101 presses against leaf 103 from both sides. In this manner a friction force is applied to leaf 101 as the clip 102 is moved due to deflection of tube 101. Leaf 103 is bent at a slight angle intermediate its ends and one end of leaf 104 is secured to leaf 103 at the bent portion of the latter. Leaf 104 is also bent at a slight angle intermediate its ends and carries contacts 105 at the bent portion for alternate engagement with contacts 106 and 107 which may be respectively connected to wires 85 and 86 (see FIG. 2). The opposite end of leaf 104 is anchored to switch housing 108 which may be covered by a plate 109.

The operation of the sensing unit of FIGURE 17 is as follows: When the pressure in tube 101 increases the tube will deflect and move clip 102 upward. The sliding motion of the clip with respect to leaf 103 will tend to straighten out that leaf. This means that the junction point of leaf 103 and leaf 104 will move to the left, referring to FIGURE 17. This will put leaf 104 into compression and tend to bend the same even further from a straight line which will cause contact 105 to engage contact 107. Upon a pressure drop in the tube 101 a reverse operation will take place as far as the deformation of the blades or leaves 103 and 104 is concerned and consequently the contact 105 will engage contact 106.

FIGURE 19 illustrates a sensing unit which is identical in part to the one shown in FIGURE 10. The pressure check valve, however, has been omitted. In order to eliminate any bad effects due to high gas temperatures the chamber wall as well as the diaphragm are lined with a heat insulating material 110 and 111 respectively. The thin plate 112 prevents the insulating material 111 from separating from the diaphragm as the latter deflects under pressure. Thus the plate 112 and the material 111 deflect or deform with the diaphragm 70. This diaphragm 70 has an integral post 113 in the center to which the lever 114 is pivotally connected by pin 115 said lever being free to pivot about said pin. The lever has a weight 116 at one end and is provided with a contact point 117 at the other end for engagement with one or the other of the contacts attached to the respective terminals 85' and 86'. This switch may be called a dynamically actuated switch and reacts to the rate of pressure increase or decrease, the operation being as follows: Reference is made to FIGURE 20 as an aid in this explanation. As the mechanical motion of the crank shaft moves past the ignition point from left to right (FIG. 20) the pressure increases and also the rate of pressure increases. This is illustrated by the curve FIGURE 20. It will be seen that the diaphragm will deflect upward with pressure increase and that the diaphragm will accelerate upwardly with a pressure rate increase. As the diaphragm accelerates upwardly, the inertia force of the weight 116 will act downwardly. Consequently the contact point 117 will move up and make contact with the point attached to terminal 86′, this condition being indicated in FIGURE 19.

At a point (indicated by the numeral 118) on the curve of FIGURE 20 near the peak pressure, the direction of curvature will reverse. At this point the acceleration of the diaphragm will change to a deceleration. Consequently the inertia force of the mass 114 will be reversed and the weight 116 will tend to move upwardly. This will move the contact point 117 downwardly so that it comes into engagement with the contact point attached to terminal 85′. This then is the operation by which the electrical signal is reversed in this type of sensing unit.

It should be explained here that the layer of sound insulating material 119 is for the purpose of dampening out any sound effects resulting from the rapid rate of diaphragm motion due to abnormal engine conditions. Actual tests have shown that under normal engine operations throughout the entire operating range the noise insulating material is not required.

FIGURE 21 illustrates a sensing unit which is similar to that of FIGURE 28 in that it utilizes the same form of insulated contact members 81′ and 82′ and is similarly provided with the gas passages 152 leading from the threaded passage 77′ to the diaphragm 70′″ adjacent the peripheral edge of the latter so that the gas is entering into the chamber below the diaphragm flow from the peripheral edge of the latter toward the center thereof. The construction of FIGURE 21 also provides a cooling chamber 175 the upper end of which is defined by the rubber gasket 176. Water may be circulated by means of suitable inlet and outlet types 177 and 178 communicating with said chamber 175.

The FIGURE 21 construction also utilizes a switch leaf 80″ which has its lower end welded or otherwise rigidly secured to the interior of a friction sleeve 180 which is frictionally received within a retainer cup 155 formed integrally with the diaphragm 70′″. The sleeve 180 is split or slotted as at 181 whereby the sleeve is capable of being slightly compressed when inserted into the retainer cup 155 and thus maintains frictional engagement therewith.

FIGURE 22 illustrates an embodiment of the sensing unit incorporated as a part of a conventional spark plug. In this embodiment the sensing unit may, as illustrated, be of the construction shown in FIGURE 21 adapted to have its threaded passage 77′ screwed onto a threaded boss 185 formed integrally with the body of the spark plug 186, the said body of the latter being provided with a gas passage 187 communicating with the threaded passage 77′ and with a cut-out portion 188 cut out of the body of the spark plug 186 and providing a passage communicating with the combustion chamber of the engine cylinder when the spark plug 186 is screwed into the threaded passage thereinto in the usual manner.

In accordance with our invention we have designed the diaphragm 70 of the sensing unit in a novel manner so as to enable it to have uniform accuracy throughout the entire pressure range. For this purpose we have so designed the diaphragm that it has a deflection range equal to the diaphragm plate thickness of the diaphragm. Since the greatest stresses in the diaphragm tend to come at the center thereof, we have tapered the diaphragm from its periphery toward the center thereof so that the thickness is gradually increasing and thereby more material is provided at the center of the diaphragm to resist the stress increases and to maintain a constant stress level throughout the diaphragm. In carrying out the foregoing novel concept we provide a diaphragm which is of dished configuration as best illustrated in FIGURE 11, said diaphragm comprising a plate initially dished from a flat plate configuration in a direction opposite to the direction of application of fluid pressure to said diaphragm, the amount of initial dish being one-half the plate thickness which places the total deflection range within one-half plate thickness from what would normally be the flat configuration provided the total deflection range is not more than one plate thickness.

Another feature of the diaphragm design involves the provision of a spherical peripheral portion which enables freedom of pivoting of the periphery relative to the retaining sleeve so as not to restrict deflection of the diaphragm. The spherical periphery further provides a good heat transfer area from the diaphragm into the retaining sleeve. Tests have shown that this formation of the periphery provides a very good gas pressure seal.

With the regard to the ratio means such as that provided as illustrated in FIGURES 7, 8 and 9 including the ratio lever 65 cooperating with the ignition timing plate 13 and the phasing points plate 50, it is noted that the same produces an opposite rotational movement of the plates 13 in a fixed ratio such as 3 to 1 cited for purposes of illustration. Instead of the fixed ratio of opposite rotational movement of the plates 13 and 50 as provided by the ratio means illustrated in FIGURES 7, 8 and 9, we contemplate the alternative provision of variable ratio means such as illustrated in FIGURES 24, 25 and 26.

In the construction of FIGURES 24, 25 and 26, the ratio lever 190 fulcrumed on an axis portion 191 the axis of which is disposed at an angle (for example an angle of 30 degrees) to a radius of the shaft 10. The ignition timing plate 13′ is provided with an arcuate slot 192 for cooperation with the spherical upper end of the lever 190. Similarly, the phasing points plate 50′ will be provided with an arcuate slot 193 for cooperation with the spherical lower end of the lever 190. It will be noted that the slots 192 and 193 are of opposite curvature. The arcuate curvature of the slots 192 and 193 may be of constant radius or they may be compound curves of changing radius, whereby in either instance they will provide a variable ratio of opposite rotational movement of the plates 13′ and 50′ which will be of a predetermined desired nature.

*General operation of the spark ignition control system*

Referring now more particularly to FIGURES 1, 2, 3, 6, 7, 8 and 9, it will be assumed that the control system has been installed on a spark ignition engine and that the initial adjustment of the distributor is such that with the solenoid armature 38 disposed at its extreme left position the plate 50 of the phasing means is so disposed relative to the distributor shaft 10 that the phasing points will reverse polarity at 2 degrees past T.D.C. of crank shaft position. That is to say, at this position of crank shaft rotation the phasing points 52 would open and the phasing points 53 would close. Thus initial adjustment of the timing adjusting plate 13 away from zero position is such that the initial setting of the plate 13 would cause ignition to occur at 6 degrees before T.D.C. of crank shaft position. In this connection it is noted that the zero condition of adjustment of the distributor would be one in which the plate 13 was adjusted so that ignition would occur simultaneous with reversal of polarity of the phasing points 52 and 53. In the employment of the system of the invention, the zero condition of distributor adjustment is correlated to T.D.C. of crank shaft rotation but since there is no practical need for the range between 6 degrees before T.D.C. and 2 degrees after T.D.C., the initial adjustment may be made as above specified for practical purposes.

The system provides a control period during which it is effective to make necessary ignition timing adjustments and this control period as illustrated in FIGURE 3 preferably coincides with a fairly wide range of combustion pressure variation on either side of peak pressure so as to enable deflection of the deflecting member of the sensing means to actuate the switch to energize the retard and advance solenoids for relatively long adjustment periods if such adjustment is called for.

The so-called control period coincides with the portion of crank shaft rotation during which the phasing points 52 or 53 are closed. As illustrated in FIGURE 3 the control period may extend for some 90 degrees of crank shaft rotation. During the first half of the control period the phasing points 52 are closed permitting the retard solenoid 32 to be energized upon downward deflection of the sensing unit deflecting member during the pressure drop after peak pressure, if spark retarding adjustment is called for by an out of phase condition of the position at which peak pressure is occurring as determined by the point of polarity change of the sensing unit switch, in relation to the point at which peak pressure should occur as determined by the point of polarity change of the phasing points.

During the second half of the control period the phasing points 53 are closed permitting the advance solenoid to be energized, if called for by such out of phase condition, by actuation of the sensing unit switch due to upward deflection of the deflecting member during the pressure rise before peak pressure.

The condition illustrated in FIGURE 3 is one in which the peak combustion pressure comes at a point 8 degrees past T.D.C. which is a point exactly midway of the control period so that it coincides with the reversal of polarity of the phasing points 52 and 53 and coincides with the reversal of polarity of the sensing unit switch, hence the two are in phase and no timing adjustment will take place. It is noted that in this condition of FIGURE 3 the ignition occurred at a point which was 24 degrees before T.D.C. and, since peak pressure occurred at 8 degrees past T.D.C., the ratio of 3 to 1 according to Upton's rule is fulfilled because the interval measured by 24 degrees of crank shaft rotation from ignition point to T.D.C. is 3 times the interval measured in degrees of crank shaft rotation from T.D.C. to peak pressure. This ratio is integrated into the control system of the invention by the mechanical interconnection of the timing adjustment plate 13 and the phasing points plate 50 through the ratio lever 65 by virtue of the fact that the zero condition of these plates is oriented to T.D.C. of crank shaft rotation and any adjustment from the zero condition causes three units of movement of the spark position toward or away from T.D.C. for every unit of movement of the point of polarity change of the phasing points toward or away from T.D.C., the rotation of the plates 13 and 50 being in opposite directions.

For an example of how the system will automatically adjust the ignition timing to cause peak combustion pressure to occur at the proper point in accordance with Upton's rule, reference is made now to FIGURE 6. For the purposes of this example, we will assume that for a particular engine operating condition the optimum peak pressure should occur at 10 degrees past T.D.C. as illustrated by curve b in FIGURE 6. To accomplish this, the ignition should occur at 30 degrees before T.D.C. to provide the ratio of 3 to 1 according to Upton's rule. Let us assume however that under the particular operating condition ignition actually is taking place too early at 36 degrees before T.D.C., curve a in FIGURE 6 representing the actual combustion pressure curve. Thus, since peak pressure is actually occurring at 4 degrees past T.D.C., the combustion time from ignition to peak pressure is 40 degrees of crank shaft rotation for this particular condition of engine operation. However this combustion time as shown by curve a is not oriented properly with respect to the proportioning of the time before and after T.D.C. in accordance with Upton's rule and, in order to produce efficient engine operation, it is necessary to reorient the combustion cycle with respect to T.D.C. so that one-fourth of the combustion time will occur after T.D.C. in order to provide the 3 to 1 ratio according to Upton's rule. For this purpose, it is necessary to retard the ignition so that it will occur at 30 degrees before T.D.C. so that the combustion time of 40 degrees for this particular engine operating condition will enable peak pressure to occur at 10 degrees past T.D.C. providing the 3 to 1 ratio according to Upton's rule, and illustrated by curve b.

It is therefore the function of the control system of the invention to determine whether or not the combustion cycle for a particular engine operating condition is properly oriented with respect to T.D.C. in accordance with Upton's rule and if the combustion cycle is not properly oriented the system serves to provide a corrective adjustment which reorients the combustion cycle with respect to T.D.C. so as to provide the proper proportioning of combustion time before and after T.D.C. in accordance with the 3 to 1 ratio of Upton's rule or in accordance with such other predetermined ratio as may be applicable.

Now proceeding with the example given and noting that we have determined where the peak pressure is actually occurring for a particular engine operating condition and that we have theoretically determined where the peak pressure should occur in accordance with Upton's rule, let us see how the system functions to make the necessary corrections.

In the example referred to, for the particular engine operating condition, ignition is occurring at 36 degrees before T.D.C.; the peak pressure at 4 degrees past T.D.C.; and the sensing unit switch will reverse polarity at this point; the phasing points will reverse polarity at 12 degrees after T.D.C.; and the theoretical correct adjustment would cause the peak pressure to occur at 10 degrees past T.D.C.

Now let us see how the system will function to accomplish this correction. During the period of rotation of the crank shaft from ignition point at 36 degrees before T.D.C. to peak pressure at 4 degrees after T.D.C. the sensing unit switch will engage contact point 81 because of upward deflection of the deflecting member due to rising pressure and since the phasing points 52 are closed and the phasing points 53 are open the solenoid 30 will not be energized. However, when peak pressure is reached at 4 degrees past T.D.C. the motion of the deflecting member is reversed to a downward direction and this causes the sensing unit switch to engage contact 82 and since phasing points 52 are still closed the circuit is completed for energization of the retard solenoid 32 for moving the armature leftwardly referring to FIGURES 2 and 8 for rotation of the timing adjustment plate 13 in a counter clockwise direction for retarding the ignition setting. Energization of the solenoid for moving the same in the leftward retard direction will continue until the crank shaft rotates to a position 12 degrees past T.D.C. at which time the polarity of the phasing points reverses so that phasing points 52 are open and phasing points 53 are closed. At this position 12 degrees past T.D.C. the solenoid will be deenergized because the circuit is broken by opening of the phasing points 52.

Thus, there was a short period of time from 4 degrees past T.D.C. to 12 degrees past T.D.C. during which or during a portion of which the retard solenoid was energized. This caused a small retardation of the ignition and similar small retarding increments would be produced at each subsequent power stroke of the engine until the reversal of polarity of the phasing points and reversal of polarity of the sensing unit switch become coincident.

In this connection it should be noted that the retarding counter clockwise rotation of the timing adjustment plate 13 caused a corresponding clockwise rotation of the phasing points plate 50 by an increment of movement equal to ⅓ of the increment of rotational movement of the timing adjustment plate 13.

Thus, the above described small increment of ignition retarding adjustment served to advance the position of polarity change of the phasing points from its initial polarity change position at 12 degrees past T.D.C. to a position somewhere between 12 degrees past T.D.C. and 10 degrees past T.D.C. Assuming that the particular engine operating condition continues, a similar timing adjustment will take place on each power stroke until reversal of the sensing unit switch coincides with reversal of polarity of the phasing points whereafter no further ignition timing adjustment will occur unless or until a different engine operating condition calls for a subsequent readjustment.

For the particular engine operating condition illustrated by curve $a$ in FIGURE 6, the total combustion time from ignition point at 36 degrees before T.D.C. to peak pressure at 4 degrees past T.D.C. was 40 degrees of crank shaft rotation. In the manner described, the ignition point was adjusted from 36 degrees before T.D.C. to 30 degrees before T.D.C. so that peak pressure occurred at 10 degrees past T.D.C. at which point the sensing unit switch reversed polarity at the same moment as reversal of polarity of the phasing points 52 and 53 occurred. In this adjusted condition the pressure curve of the combustion cycle is represented by the curve $b$ in FIGURE 6 and it will be noted that the combustion time from ignition point at 30 degrees before T.D.C. to peak pressure at 10 degrees past T.D.C. occupies 40 degrees of crank shaft rotation, the same length of combustion time as was the case before adjustment when the combustion cycle was represented by curve $a$. However the subsequent readjustment represented by curve $b$ graphically illustrates the manner in which the shifted combustion cycle now accords with Upton's rule by causing ¾ of the combustion time to occur before T.D.C. and ¼ of combustion time to occur after T.D.C.

In the foregoing example represented by curve $a$ of FIGURE 6 the ignition occurred too early. For the next example we will assume that for a particular engine operating condition the combustion cycle is represented by curve $c$ of FIGURE 6, in which ignition occurs at 24 degrees before T.D.C. and peak pressure occurs at 16 degrees past T.D.C., the total time of combustion being 40 degrees from ignition to peak pressure. In this case however, the ignition occurs too late so that the combustion time is not properly proportioned in reference to the portion occurring before T.D.C. as compared with the portion occurring after T.D.C. Under this condition it is again necessary to readjust the ignition timing so that the combustion cycle conforms with pressure curve $b$ of FIGURE 6. For this purpose it will be necessary to advance the ignition so that it will occur at 30 degrees before T.D.C. instead of 24 degrees before T.D.C. as illustrated by curve $c$.

Since in the example represented by curve $c$ ignition is occurring at 24 degrees before T.D.C., the instant adjustment of the distributor is such that the phasing points 52 and 53 will reverse polarity at 8 degrees past T.D.C. This is because the timing adjustment plate 13 has an instant adjustment rotated 24 degrees in a clockwise direction from its zero position and consequently the phasing points plate 50 has necessarily been rotated in the opposite or counter clockwise direction by 8 degrees from its zero position. Under the condition illustrated by curve $c$ the sensing unit switch will reverse polarity at 16 degrees past T.D.C. at which time peak pressure is occurring according to this example.

Now let us see how the control system of the invention will operate to correct the instant condition represented by curve $c$ so as to readjust the combustion cycle to conform with curve $b$. During rotation of the crank shaft from 24 degrees before T.D.C. to 16 degrees past T.D.C. the sensing unit switch will engage contact 81. During the first portion of the combustion cycle phasing points 52 will be closed and phasing points 53 will be open so that the solenoid 30 will not be energized. However, when the crank shaft reaches the position 8 degrees past T.D.C. the phasing points will reverse polarity so that phasing points 52 will open and phasing points 53 will close. Since the sensing unit switch at this time is engaging contact 81 the circuit will be completed energizing the advance coil 33 of the solenoid 30 which will move the armature rightwardly referring to FIGURES 2 and 8 causing clockwise rotation of the timing adjustment plate 13. The advance coil 33 of the solenoid will continue to be energized until the crank shaft reaches the position 16 degrees past T.D.C. at which time the sensing unit switch will reverse polarity switching from contact 81 to contact 82 thereby breaking the circuit and deenergizing the solenoid.

Thus the advance solenoid was energized for a short interval of time during rotation of the crank shaft from 8 degrees past T.D.C. to 16 degrees past T.D.C. and this will serve to cause a small increment of clockwise rotation of the timing adjustment plate 13 serving to advance the time of ignition from its original position 24 degrees before T.D.C. toward the position 30 degrees before T.D.C. and similar small increments of rotational adjustment of the timing plate 13 will occur on each succeeding power stroke until the reversal of polarity of the sensing unit switch coincides with the reversal of polarity of the phasing points 52 and 53.

Each small increment of clockwise rotational adjustment of the timing adjustment plate 13 will effect a corresponding counterclockwise rotation of the phasing control plate 50 so as to retard the point at which reversal of polarity of the phasing points occurs from the initial position 8 degrees past T.D.C. toward a position 10 degrees past T.D.C. The increment of rotational movement of the phasing points plate 50 on each power stroke will be ⅓ of the increment of rotational adjustment of the timing adjustment plate 13 in the opposite rotational direction. Assuming continuance of the particular engine operating condition during subsequent power strokes the foregoing timing adjustment will continue until the reversal of polarity of the sensing unit switch coincides with the reversal of polarity of the phasing points at the position 10 degrees past T.D.C. after which no further adjustment will take place and the pressure curve of the combustion cycle will again be represented by the curve $b$ of FIGURE 6.

Thus, the control system of the invention serves to provide adjustable ignition timing means mechanically integrated with a control instrumentality providing a shiftable control point (point at which the phasing points reverse polarity) oriented with respect to T.D.C. position of crank shaft rotation in such fashion as to cause ignition to occur a given interval before T.D.C. having a predetermined relation to the position of the control point past T.D.C.; sensing means responsive to variation in combustion pressure in the combustion chamber for determining the position of crank shaft rotation at which peak pressure occurs; and timing adjustment means responsive to a differential between the position of the control point with respect to T.D.C. of crank shaft rotation and the position at which peak pressure occurs with respect to T.D.C. of crank shaft rotation for adjusting the ignition timing means so as to effectuate coincidence of peak pressure with the position of the control point.

FIGURE 5 shows pressure curves illustrative of the operation of the control system of the invention, the two upper curves respectively illustrating the combustion cycles at the same constant high manifold pressure but at two different engine speeds. Thus curve $d$ illusstrates the combustion cycle at a given high manifold pressure and a given engine speed, wherein ignition occurs at 15 degrees before T.D.C. and peak pressure occurs at 5 degrees past T.D.C., thereby providing the 3 to 1 ratio in accordance with Upton's rule. Curve *e* in FIGURE 5 illustrates the combustion cycle at the same constant high manifold pressure but at a different engine speed, wherein ignition occurs at 30 degrees before before T.D.C. and peak pressure occurs at 10 degrees past T.D.C. Curve *f* in FIGURE 5 illustrates the combustion cycle for a given low manifold pressure and a given engine speed wherein ignition occurs at 15 degrees before T.D.C. and peak pressure occurs at 5 degrees past T.D.C. Curve *g* in FIGURE 5 illustrates the combustion cycle for the same low constant manifold pressure but a different engine speed wherein ignition occurs at 30 degrees before T.D.C. and peak pressure occurs at 10 degrees past T.D.C.

With regard to the sensing unit shown in FIGURE 15, it will be understood that the diaphragm can be enlarged so as to constitute the entire cylinder head.

*Alternate means for phasing the sensing unit to the distributor*

The basic system of the invention is shown in FIGURE 2. A solenoid generally indicated by the numeral 125 has been added in the alternate system shown in FIGURE 4. This solenoid 125 has practically no friction to overcome other than the pivoting of arm 126 on pin 127. This solenoid actuates switch 128 to engage either contact 129 or contact 130 depending on the position of switch 80 of the sensing unit and the position polarity change of the phasing points.

In this alternate system, the phasing points adjustment plate carries two breaker arms 131 and 132, each operable by a respective cam secured to the distributor shaft in the manner previously described. However breaker arm 131 engages contact 133 throughout the entire length of the control period such as illustrated in FIGURE 3. During the first half of the control period breaker arm 132 engages phasing contact point 52' and during the second half of the control period breaker arm 132 engages phasing contact point 53'. Thus phasing contact points 52' and 53' correspond in function to phasing contact points 52c and 53c respectively of the system of FIGURE 2 and the crank shaft position (or distributor shaft position) at which reversal of polarity of the phasing points 52' and 53' occurs is adjusted in the same manner as in the system of FIGURE 2, namely by rotational adjustment of the phasing points plate 50' in a given relationship to corresponding rotational adjustment of the ignition timing plate 13.

Figure 1:
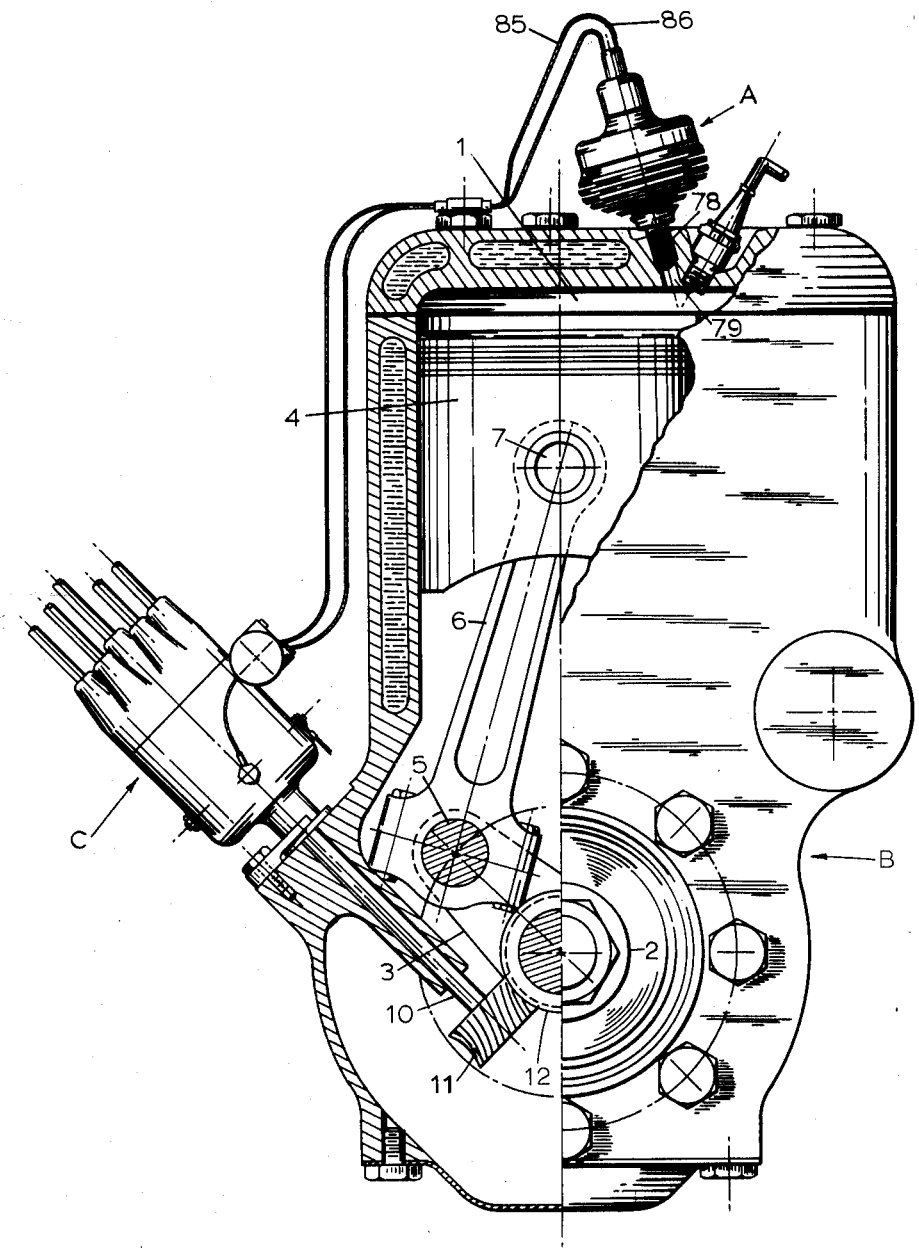
FIGURE 1 is a view showing an internal combustion engine of the spark ignition type, embodying the invention, the view showing one cylinder partly in section to illustrate the manner of incorporating the sensing means.
Figure 4:
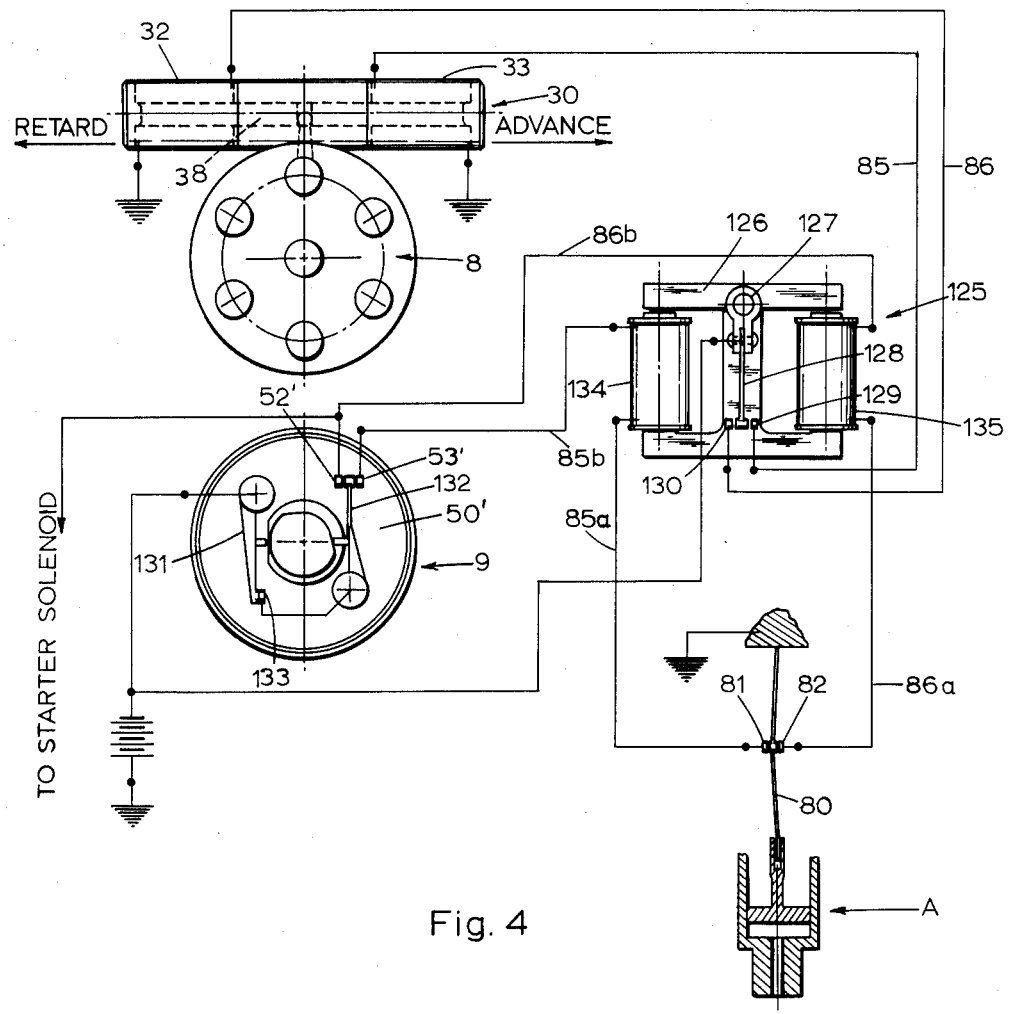
FIGURE 4 is a view similar to FIGURE 2 but showing a modification in reference to the means for transmitting the electrical signal from the sensing means to the timing adjustment solenoids.

The operation of the alternate system of FIGURE 4 is essentially the same as that of the system of FIGURE 2. Thus if sensing switch 80 makes contact with point 81 while arm 132 engages phasing contact point 53' the circuit will be completed through wires 85a and 85b serving to energize solenoid coil 134 causing switch 128 to engage contact 129 to complete circuit through wire 85 to energize the advance coil 33 of timing adjustment solenoid 30.

On the other hand, if sensing switch engages contact 82 while arm 132 engages phasing contact point 52' the circuit will be completed through wires 86a and 86b to energize solenoid coil 135 to cause engagement of switch 128 with contact 130 to complete circuit through wire 86 to the retard coil of timing adjustment solenoid 30.

Thus, the system of FIGURE 4 will operate in the same manner as the system of FIGURE 2 to adjust the ignition timing in the event of an out-of-phase condition in respect to the crank shaft position at which the sensing unit switch reverses polarity and the position at which the phasing points 52' and 53' reverse polarity.

By the employment of the solenoid 125 as in the system of FIGURE 4 the service life of the sensing unit contact switch 80 and points 81 and 82 may be increased since it is not necessary to pass a heavy current therethrough in order to energize the solenoid 30; it is only necessary to pass a relatively light current through the switch 80 and contact points 81 or 82 in order to energize the solenoid coils 134 or 135 and upon the energization of one of these coils a heavier current may pass through the switch 128 and contact points 129 or 130 for energization of the timing adjustment solenoid 30.

In the system of FIGURE 4 also the spring switch 128 will engage either of the contacts 129 or 130 with a spring bias so that the switch will maintain spring biased engagement for a slightly longer period after de-energization of either of the solenoid coils 134 or 135 and thus the period during which timing adjustment may occur on each power stroke will be somewhat lengthened so as to effect more rapid adjustment than would otherwise be the case. This characteristic of the switch 128 will not materially slow down the shifting of switch 128 from one contact 129 or 130 to the other upon energization of either of the solenoid coils 134 or 135.

It may be noted that in the system of FIGURE 4 as in the system of FIGURE 2 the starter solenoid is connected in the system circuit in such a manner that whenever the starter solenoid is energized the retard coil 32 of the timing adjustment solenoid 30 will be energized for a portion of each power stroke to effect ignition retarding adjustment as desirable for starting of the engine.

*Adaptation of the system to fuel injection timing*

As hereinbefore indicated, the control system of the invention is applicable to fuel injection timing as well as to spark ignition timing control. In diesel engines ignition is initiated by the injection of fuel and in certain types of spark ignition engines employing fuel injection directly into the cylinders, the control system of the invention is likewise applicable to the control of the timing of the fuel injection as well as the timing of the spark ignition. For this reason the term "ignition" as used herein is intended to be broadly understood as referring to the time of fuel injection as well as to the time of spark ignition wherever the system of the invention is applied to either or wherever the system of the invention is applied to control of initiation of the combustion cycle.

As exemplary of an embodiment of the invention for purposes of control of fuel injection, reference is now made to FIGURES 27 through 34 inclusive. In these figures the control system of the invention is applied to control of fuel injection in a diesel engine. In this embodiment, the diesel engine generally indicated by the numeral 140 is of a conventional design and has the usual crank shaft 141 which, through a conventional gear train 142 is geared to shaft 145 of the timing mechanism generally designated by the letter D, shaft 145 being geared to rotate at one-half the rotational speed of the crank shaft 141. Shaft 145 is coupled through a shiftable coupling mechanism generally designated 144 to a shaft 143 which in turn is geared to rotate the cam shaft 146 of the fuel injection pump 147 at the same rotational speed as that of the shafts 143 and 145. The sensing unit generally designated by the letter A is mounted on the engine 140 so as to be in communication with the combustion chamber of one of the cylinders designated 148 through a communicating passage 149 in a manner previously described. The contacts 81' and 82' of the sensing unit switch are connected to wires 85' and 86' respectively leading to the timing mechanism.

The sensing unit A in this adaptation of the invention may take the form shown in FIGURE 28 which is similar in basic construction to other units previously described herein. In the sensing unit of FIGURE 28 however the peripheral edge 150 of the diaphragm 70" is circular in cross section and bears against a retaining ring 151 which has a groove of conforming arcuate curvature thus providing a relatively large contact area between the diaphragm and the retaining ring which provides for increased transfer of heat and thus more rapid heat dissipation from the diaphragm to the housing. Another feature of this construction which aids heat dissipation is the location of the gas passages 152 leading from the threaded passage 77' to the diaphragm 70'' adjacent the peripheral edge of the latter so that gases entering into the chamber below the diaphragm flow from the peripheral edge of the latter toward the center thereof. Thus the hot spots of the diaphragm are adjacent the peripheral edge thereof from which the heat can readily be transferred from the diaphragm into the housing which is equipped with cooling fins. In FIGURES 28 and 29 the switch leaf 80' has its lower end secured to the center of a friction cup 153 which is cut in such a manner as to provide a series of fingers 154. The cup 153 is received within a retainer cup 155 formed integrally with the diaphragm 70'', in such a manner that the fingers 154 press outwardly against the wall of the cup 155 for frictional engagement therewith. This construction provides a uniform pressure distribution around the periphery of the cup 153. This results in a pure axial tension and compression loading of the leaf 80' and adds to the life expectancy thereof.

Referring now to FIGURES 31 to 34 the timing mechanism comprises a solenoid 30' similar to that of FIGURE 8 and having an advance coil 33' which when energized serves to move the armature 38' in a rightward direction and the retard coil 32' when energized serves to move the armature in a leftward direction, referring to FIGURE 31. The solenoid 30' is secured to the housing 163 containing the shafts 143 and 145 and the shiftable coupling means 144 previously mentioned.

Shaft 145 has an extension 145b which extends into a corresponding recess in the shaft 143 for assisting in alignment of the two shafts. Each of the shafts 143 and 145 has an enlarged diameter portion designated 143a and 145a respectively, the said enlarged diameter portions being disposed in face to face engagement. Each of the enlarged diameter portions 143a and 145a is provided with a plurality of equidistantly spaced slots in their circumferential peripheries, these slots being designated 143c and 145c respectively. These slots extend in planes parallel to the axis of the shafts 143 and 145 but the slots are angularly disposed with respect to said axis, the slots 143c being of opposite angular disposition or pitch with respect to that of the slots 145c. The pitch of slots 143c and 145c is within the friction angle of the pins 157 and 158 against their respective slots so as to prevent creep-back of shaft 143 relative to shaft 145 due to torque loading of the injection pump 147 during the fuel injection stroke.

The shiftable means for coupling the shafts 143 and 145 comprises a sleeve 156 from which pins 157 extend into slots 143c and from which sleeve pins 158 extend into slots 145c, one pin for each slot. The sleeve 156 is shiftable axially of the shafts 143 and 145 to vary the rotational position of the shafts 143 and 145 relative to one another. For example if the sleeve 156 is shifted rightwardly referring to FIGURE 31, shaft 143 will be rotated in a clockwise direction referring to FIGURES 32 and 33 and this being opposite to the direction of rotation of the sleeve 156 and shafts 143 and 145 will serve to retard the time of fuel injection relative to crank shaft position. Similarly, leftward shifting of the sleeve 156, referring to FIGURE 31, will serve to rotate shaft 143 in a counterclockwise direction, referring to FIGURES 32 and 33, relative to shaft 145, thereby resulting in advancing adjustment of the fuel injection relative to crank shaft position.

It will be understood that sleeve 156 and shafts 143 and 145 rotate as a unit in the counterclockwise direction referring to FIGURES 32 and 33 and that the shifting of the sleeve 156 serves merely to vary the rotative positioning of shafts 143 and 145 relative to one another.

A ball bearing cage 159 extends around the sleeve 156 with the inner race 160 fixed to the sleeve. A lever 161 is provided having its lower end of fork shape as seen in FIGURE 32 to extend partially around the ball bearing cage 159, the lever being pivoted to sleeve 156 by pivot pins 162. The lever 161 has a spherical end 161a which fits into a passage 164 machined into the armature 38' of the solenoid 30'. Lever 161 has slots 161b into which extend pins 165 fixed to housing 163 whereby movement of the lever by the armature of the solenoid about the fulcrum of the pins 165 serves to shift the sleeve 156.

In this embodiment of the invention the phasing control means comprises a circular plate 166 which is mounted on the shaft 145 for rotation of the latter shaft relative to said plate.

Mounted on the plate 166 are two sets of breaker points 52'' and 53'' referred to herein as the phasing points and corresponding in function and operation to the phasing points 52 and 53 of the system for spark ignition control previously described herein. That is to say, the contact arms of the phasing breaker points 52'' and 53'' each have a cam finger engaging respective cams on the shaft 145 and the operation is such that phasing points 52'' are closed and the phasing points 53'' are open during the first half of the control period. The construction and arrangement is such that the phasing points 52'' and 53'' reverse polarity simultaneously so that the phasing points 52'' are open and the phasing points 53'' are closed at a given point in the rotation of the shaft 145. This control point at which the phasing points reverse polarity can be shifted relative to crank shaft position by rotation of the plate 166 in one direction or the other relative to shaft 145.

Rotational adjustment of the phasing points plate 166 relative to shaft 145 is effected by means of an actuating rod 167 one end of which is attached to a bracket 168 secured to the ball bearing cage 159. The actuator member 167 is slidable in a bushing 169 extending through a web 171 formed integrally with the housing 163. Member 167 is formed with a spherical end 167a slidably cooperable with a channel guide 170 extending through the plate 166 eccentrically with respect to the axis of the shaft 145. The channel guide 170 extends in a plane parallel to the plane of the axis of shaft 145 but is angularly disposed relative to said axis in such a manner that axial movement of the member 167 relative to the channel guide 170 will effect rotational adjustment of the plate 166 in one direction or the other depending upon the direction of movement of the actuator member 167 along its own axis.

Thus it will be understood that any axial shifting movement of the coupling means 144 will effect corresponding rotational adjustment of the phasing control plate 166 and the rotational adjustment of the plate 166 will be in the same direction as the direction of rotational adjustment of the shaft 143 relative to the shaft 145. Also it is to be noted that the rotational adjustment of the plate 166 will have a predetermined relation to the rotational adjustment of the shaft 143 relative to shaft 145 and this predetermined relation may be either a fixed ratio or a variable ratio. Thus, for example, the arrangement can be such as to effect one unit of rotational movement of the plate 166 for every 6 units of rotational movement of the shaft 143 relative to shaft 145 in the same direction whereby to provide a ratio of 6 to 1 which would be applicable to certain diesel engine designs in which maximum efficiency might be obtained with a combustion cycle in which the time from ignition point to T.D.C. was 6 times as long as the time from T.D.C. to peak pressure.

A varying ratio of rotational movement of the plate 166 with respect to the rotational movement of the shaft 143 relative to shaft 145 could be obtained by providing a predetermined curvature of the guide channel 170 in line with similar considerations of design such as previously described with reference to FIGURES 25 and 26. However for the purposes of describing the operation of this diesel engine application of the control system of the invention, it will be assumed that a fixed ratio of 6 to 1 is provided for.

*General operation of the fuel injection control system*

The zero condition of adjustment of the timing means D would be one in which the rotational position of the shaft 143 relative to the shaft 145 was such that fuel injection by the pump 147 would occur simultaneously with reversal of polarity of the phasing points 52" and 53". This zero condition of timing adjustment is oriented to T.D.C. of crank shaft rotation. Thus, since there is no practical need for the range between 3 degrees before T.D.C. and T.D.C., the initial adjustment can be such that fuel injection would take place at 3 degrees before T.D.C. and reversal of polarity of the phasing points would occur at ½ degree past T.D.C.

Let us assume, for an example, that for a given condition of engine operation the length of the combustion period is 42 degrees of crank shaft rotation. For maximum efficiency, therefore, if the desired ratio is 6 to 1, ignition should occur at 36 degrees before T.D.C. and peak pressure should occur at 6 degrees past T.D.C. This is represented by curve *e*, FIGURE 35. Let us now assume the first case represented by curve *d*, where the ignition is occurring too early, say at 42 degrees before T.D.C., and peak pressure is occurring at T.D.C. This means that the phasing points switch will reverse polarity at 7 degrees past T.D.C. and that shaft 143 has been rotated in a counterclockwise direction so that ignition is occurring at 42 degrees before T.D.C. In this condition the phasing points plate 166 will have been rotated in a counterclockwise direction from its zero position so that the phasing points will reverse polarity at 7 degrees past T.D.C. Since the length of the combustion cycle is 42 degrees from ignition to peak pressure, the sensing unit switch will reverse polarity at T.D.C.

Under these conditions, the sensing unit switch 80' will engage contact 81' during the first part of the combustion cycle during which the phasing points 52" are closed and the phasing points 53" are open and thus the solenoid 30' will not be energized. However, when the crank shaft reaches T.D.C., peak pressure will occur and the sensing unit switch 80 will reverse polarity shifting to engage contact 82' and since phasing points 52" are still closed the retard coil 32' of the solenoid 30' will be energized to cause leftward retarding movement of the armature 38', referring to FIGURES 30 and 31. This in turn will cause lever 161 to rotate counterclockwise about pivots 165 thereby shifting sleeve 156 rightwardly (FIG. 31) thereby effecting clockwise rotational adjustment of shaft 143 relative to shaft 145 (FIGURES 32 and 33) thus retarding injection of fuel by the pump 147. This rotational adjustment of the shaft 143 relative to shaft 145 will effect clockwise rotational adjustment of phasing points plate 166 (FIG. 33) in the desired ratio whereby to advance the position of reversal of polarity change of the phasing points relative to crank shaft position. The foregoing adjusting movement will continue until the crank shaft reaches a position between 6 and 7 degrees past T.D.C. at which the polarity reversal of the phasing points will occur under the new adjustment. At the occurrence of the reversal of polarity of the phasing points when phasing points 52" open and phasing points 53" close, the circuit to the retard coil of the solenoid will be broken and no further adjustment will occur until the next power stroke of the piston during which a similar adjustment will occur until reversal of polarity of the phasing points coincides with reversal of polarity of the sensing unit switch at 6 degrees past T.D.C. after which no further adjustment will occur until a subsequent change of operating condition producing an out of phase relation of the position of the reversal of polarity of the sensing unit switch with respect to the position of reversal of polarity of the phasing points calls for a new adjustment.

The adjustment just described will result in ignition occurring at 36 degrees before T.D.C. with peak pressure occurring at the optimum point 6 degrees past T.D.C. as in curve *e* of FIGURE 35 to accord with the desired ratio of 6 to 1 in respect to the time from ignition point to T.D.C. as compared with the time from T.D.C. to peak pressure.

Now describing the second case represented by curve *f* of FIGURE 35 wherein ignition occurs too late, let us say at 30 degrees before T.D.C. Under this condition, assuming the same engine operating condition as in the previous case, the length of the combustion cycle will be 42 degrees from ignition point to peak pressure so that with ignition occurring at 30 degrees before T.D.C. the sensing unit switch will reverse polarity at 12 degrees past T.D.C. and the phasing points will reverse polarity at 5 degrees past T.D.C. in accordance with the established 6 to 1 ratio. In this case, therefore, it is necessary to advance the timing adjustment so that ignition will occur at 36 degrees before T.D.C. in accord with curve *e*. In this case sensing unit switch 80' will engage contact 81' during the first part of the combustion cycle during which phasing points 52" are closed and phasing points 53" are open so that the solenoid 30' will not be energized until the crank shaft reaches a position 5 degrees past T.D.C. at which point polarity of the phasing points will reverse so that phasing points 52" will open and phasing points 53" will close. Since at this time sensing unit switch 80' will still engage contact 81' the circuit will be completed through the advance solenoid 33' which will continue to be energized until the crank shaft reaches a position 12 degrees past T.D.C. at which time peak pressure is reached and reversal of polarity of the sensing unit switch will occur so as to shift the same from engagement with contact 81' to engagement with contact 82' thereby breaking the circuit and de-energizing the solenoid. However during the period from 5 degrees past T.D.C. to 12 degrees past T.D.C. when the advance solenoid 33' was energized this served to effect rightward advancing movement of the armature 38' (FIGURES 30, 31) causing leftward movement of the sleeve 156 to effect counter clockwise rotational adjustment of the shaft 143 relative to shaft 145 to advance the ignition point (fuel injection point) relative to crank shaft position toward the desired ignition point of 36 degrees before T.D.C. The advancing leftward movement of sleeve 156 served also to rotate phasing points plate 166 in a counter clockwise direction (FIG. 33) relative to shaft 145 to retard the phasing points polarity reversal position relative to crank shaft position. The foregoing adjustment will continue to occur on successive power strokes of the piston until the reversal of polarity change of the sensing unit switch coincides with reversal of polarity of the phasing points after which no further adjustment will occur, the adjustment having served to adjust the ignition point to 36 degrees past T.D.C. with peak pressure occurring at 6 degrees past T.D.C. at which latter point the sensing unit switch and the phasing points will reverse polarity coincidentally, as in curve *e*, FIGURE 35.

The employment of transistors as indicated at 195 (FIGURE 30) operates to control the flow of current in such a manner as to permit low amperage current to flow in the control circuit to the phasing points 52", 53" and the sensing points 81', 82', the lighter lines indicating the portions of the circuit through the which such low amperage current may flow. Whenever the circuit is completed from one of the sensing points through one of the phasing points to one of the transistors then the higher amperage current is permitted to flow for energizing either the advance solenoid or the retard solenoid coils, the portions of the circuit through which the higher amperage current is permitted to flow being indicated by heavy lines in FIGURE 30.

While for purposes of illustration herein the control system of the invention has been shown applied to 4-cycle engines of the spark ignition and fuel injection types, it will be understood that the invention is equally applicable to 2-cycle engines of both types.

Also it will be understood that means other than electrical means can be used to effect timing adjustment in accordance with the invention. For example, hydraulic or vacuum operating means could be substituted.

It will readily be understood also that separate control systems can be provided for individually controlling the ignition timing for each cylinder responsive to variations in the combustion cycle of each cylinder. However since the variations from cylinder to cylinder are relatively minor, the provision of a single control system of the invention responsive to operation of any one cylinder of a multi-cylinder engine has been found to be quite satisfactory for all practical purposes in producing a very high degree of efficiency.

It may be pointed out that there is a slight time lag in the operation of the sensing unit due to the inertia of the pressure responsive member in that the same reaches its maximum deflection slightly after the actual peak pressure. However due to the design of the deflecting member in accordance with the invention herein disclosed, this time lag is a constant which can readily be compensated for by initial preadjustment of the orientation of the zero position of the phasing control means with respect to the ignition timing means, which adjustment will take into account the constant time lag of the pressure responsive member and thus result in operation of the system exactly as if the pressure responsive member reached its maximum peak deflection at the exact instant of maximum combustion pressure.

There is also a time lag in the operation of the sensing unit switch which may occur if the same is not properly designed. In this connection, it is to be noted that there are two design parameters to be considered in connection with the geometry of the sensing unit switch. One of these parameters is the delay in switch action due to inertia effects of the switch and this involves the amount of bend initially provided in the switch leaf—the more acute the angle of bend the swifter will be the switch action, because of the greater transverse force acting at the mass center of the moving contact points. The other parameter is the displacement of the deflecting member in a downward direction after it has reached its maximum or peak deflection. The more acute the angle of bend in the leaf the greater will be the diaphragm movement in a downward direction, after the point of maximum diaphragm deflection, in order to displace the center switch contact points from one stationary contact point to the other stationary contact point.

In accordance with our invention we so design the switch that the static friction force between the switch leaf 80 and the diaphragm 70 is sufficient to prevent slippage between these two members which would otherwise occur due to the force created by the inertia action of the center contact point 80a as it accelerates in movement from one position to the other of engagement with contact points 81 and 82 after the diaphragm has changed direction of motion immediately past its maximum deflection position.

By such design we provide a switch in which the time increment is a minimum, referring to the time increment during which the diaphragm deflection required to displace the center contact point from one position to the other occurs. Since no slippage takes place between the switch leaf and the diaphragm during the period of contact point displacement, the aforesaid time increment will approach a constant value for all engine operating conditions and consequently the time lag in switch operation can be compensated for by initial adjustment of the phasing control means relative to the ignition timing means.

We claim:

1. Combustion control means for an internal combustion engine comprising, in combination, adjustable ignition timing means for such engine, a control instrumentality providing a shiftable control point, said ignition timing means and said control instrumentality being oriented with respect to T.D.C. of crank shaft rotation of such engine, means interconnecting said ignition timing means and said control instrumentality for effecting shifting of the control point with respect to T.D.C. upon adjustment of said ignition timing means with respect to T.D.C. in a predetermined relationship to one another whereby ignition is caused to occur a given interval before T.D.C. having a predetermined relation to the position of the control point past T.D.C., sensing means responsive to variation in combustion pressure in the combustion chamber of such engine for sensing the position of crank shaft rotation at which peak combustion pressure occurs, and ignition timing adjusting means responsive to a differential between the position of the control point with respect to T.D.C. and the position at which said peak pressure occurs with respect to T.D.C. for adjusting the ignition timing means so that peak pressure coincides with the position of the control point.

2. Combustion control means as in claim 1 wherein said interconnecting means comprises instrumentalities providing a fixed ratio of the time interval between ignition point and T.D.C. to the time interval between T.D.C. and peak pressure.

3. Combustion control means as in claim 1 wherein said interconnecting means provides a variable ratio of the time interval between ignition point and T.D.C. to the time interval between T.D.C. and peak pressure.

4. Combustion control means as in claim 1, wherein the interconnecting means effects retarding adjustment of the control point with respect to crank shaft position upon ignition advancing adjustment of said timing means and effects advancing adjustment of the control point with respect to crank shaft position upon ignition retarding adjustment of said timing means.

5. Combustion control means as in claim 1, wherein said control instrumentality comprises a first control device operatively conditioned to permit adjustment of the ignition timing means in one direction during one phase of crank shaft rotation and a second control device operatively conditioned to permit adjustment of said ignition timing means in the opposite direction during a succeeding phase of crank shaft rotation, either of said control devices being inoperatively conditioned while the other is operatively conditioned, said control point being that position of crank shaft rotation at which the first control device becomes inoperatively conditioned and the second control device becomes operatively conditioned.

6. Combination control means as in claim 1, wherein said control instrumentality comprises a first control device operatively conditionned to permit adjustment of the ignition timing means in one direction during one phase of crank shaft rotation and a second control device operatively conditioned to permit adjustment of said ignition timing means in the opposite direction during a succeeding phase of crank shaft rotation, either of said control devices being inoperatively conditioned while the other is operatively conditioned, said control point being that position of crank shaft rotation at which the first control device becomes inoperatively conditioned and the second control device becomes operatively conditioned, and wherein the interconnecting means effects retarding adjustment of the control point with respect to crank shaft position upon ignition advancing adjustment of said timing means and effects advancing adjustment of the control point with respect to crank shaft position upon ignition retarding adjustment of said timing means.

7. Combustion control means as in claim 1, wherein said timing means includes a rotatable shaft driven by said engine, a timing member mounted to said shaft for rotative adjustment relative thereto, and said control instrumentality includes a control member mounted to said shaft for rotative adjustment relative thereto, first and second control devices carried by said control member, means on said shaft cooperable with said control devices to operatively condition said first control device to permit rotative adjustment of the ignition timing member in one rotative direction during one phase of rotation of said shaft and to operatively condition said second control device to permit rotative adjustment of the ignition timing member in the opposite rotative direction during a succeeding phase of rotation of said shaft.

8. Combustion control means as in claim 1, wherein said timing means includes a rotatable shaft driven by said engine, a timing member mounted to said shaft for rotative adjustment relative thereto, and said control instrumentality includes a control member mounted to said shaft for rotative adjustment relative thereto, first and second control devices carried by said control member, means on said shaft cooperable with said control devices to operatively condition said first control device to permit rotative adjustment of the ignition timing member in one rotative direction during one phase of rotation of said shaft and to operatively condition said second control device to permit rotative adjustment of the ignition timing member in the opposite rotative direction during a succeeding phase of rotation of said shaft, either of said control devices being inoperatively conditioned while the other is operatively conditioned, said control point being that position of crank shaft rotation at which the first control device becomes inoperatively conditioned and the second control device becomes operatively conditioned.

9. Combustion control means as in claim 1, wherein said timing means includes a rotatable shaft driven by said engine, a timing member mounted to said shaft for rotative adjustment relative thereto, and said control instrumentality includes a control member mounted to said shaft for rotative adjustment relative thereto, first and second control devices carried by said control member, means on said shaft cooperable with said control devices to operatively condition said first control device to permit rotative adjustment of the ignition timing member in one rotative direction during one phase of rotation of said shaft and to operatively condition said second control device to permit rotative adjustment of the ignition timing member in the opposite rotative direction during a succeeding phase of rotation of said shaft, either of said control devices being inoperatively conditioned while the other is operatively conditioned, said control point being that position of crank shaft rotation at which the first control device becomes inoperatively conditioned and the second control device becomes operatively conditioned, and means associated with said sensing means and with said adjusting means for effecting operation of the latter through the operatively conditioned control device to adjust the ignition timing means to retard ignition when peak pressure is occurring before the control point and to advance ignition when peak pressure is occurring after the control point.

10. Combustion control means as in claim 1, wherein said control instrumentality comprises a first control device operatively conditioned to permit adjustment of the ignition timing means in one direction during one phase of crank shaft rotation and a second control device operatively conditioned to permit adjustment of said ignition timing means in the opposite direction during a succeeding phase of crank shaft rotation.

11. Combustion control means as in claim 1, wherein said control instrumentality comprises a first control device operatively conditioned to permit adjustment of the ignition timing means in one direction during one phase of crank shaft rotation and a second control device operatively conditioned to permit adjustment of said ignition timing means in the opposite direction during a succeeding phase of crank shaft rotation, either of said control devices being inoperatively conditioned while the other is operatively conditioned, said control point being that position of crank shaft rotation at which the first control device becomes inoperatively conditioned and the second control device becomes operatively conditioned, and means associated with said sensing means and with said adjusting means for effecting operation of the latter through the operatively conditioned control device to adjust the ignition timing means to retard ignition when peak pressure is occurring before the control point and to advance ignition when peak pressure is occurring after the control point.

12. Combustion control means as in claim 1, wherein said control instrumentality comprises a first control device operatively conditioned to permit adjustment of the ignition timing means in one direction during one phase of crank shaft rotation and a second control device operatively conditioned to permit adjustment of said ignition timing means in the opposite direction during a succeeding phase of crank shaft rotation, either of said control devices being inoperatively conditioned while the other is operatively conditioned, said control point being that position of crank shaft rotation at which the first control device becomes inoperatively conditioned and the second control device becomes operatively conditioned, and means associated with said sensing means and with said adjusting means for effecting operation of the latter through the operatively conditioned control device to adjust the ignition timing means to retard ignition when peak pressure is occurring before the control point and to advance ignition when peak pressure is occurring after the control point, and wherein the interconnecting means effects retarding adjustment of the control point with respect to crank shaft position upon ignition advancing adjustment of said timing means and effects advancing adjustment of the control point with respect to crank shaft position upon ignition retarding adjustment of said timing means.

13. The method of controlling combustion in an internal combustion engine, which comprises integrating a shiftable control point with the ignition point so that the control point is shiftable to a position past T.D.C. of crank shaft rotation in a predetermined relationship to the position of the ignition point before T.D.C., determining the position of crank shaft rotation at which peak combustion pressure occurs, and shifting the ignition point to coincide with the control point whenever peak pressure occurs out of phase with the control point.

References Cited by the Examiner

UNITED STATES PATENTS

| 1,839,447 | 1/32 | Stanton | 123—117 |
| 2,082,709 | 6/37 | Mallory | 123—148 |
| 2,084,267 | 6/37 | Hicks | 123—148 |
| 2,777,029 | 1/57 | Langstroth | 200—83 |
| 2,790,043 | 4/57 | Clason | 200—83 |

RICHARD B. WILKINSON, *Primary Examiner.*